(12) United States Patent
Isobe

(10) Patent No.: US 8,605,745 B2
(45) Date of Patent: Dec. 10, 2013

(54) COMMUNICATION APPARATUS AND COMMUNICATION SYSTEM FOR ENHANCING SPEED OF COMMUNICATIONS BETWEEN TERMINALS

(75) Inventor: Takashi Isobe, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/392,262

(22) PCT Filed: Aug. 19, 2010

(86) PCT No.: PCT/JP2010/063973
§ 371 (c)(1),
(2), (4) Date: Apr. 11, 2012

(87) PCT Pub. No.: WO2011/033894
PCT Pub. Date: Mar. 24, 2011

(65) Prior Publication Data
US 2012/0189006 A1      Jul. 26, 2012

(30) Foreign Application Priority Data
Sep. 16, 2009   (JP) .................................. 2009-214015

(51) Int. Cl.
*H04J 3/00* (2006.01)
(52) U.S. Cl.
USPC ...................................................... 370/464
(58) Field of Classification Search
USPC .............. 370/464, 465, 468, 351, 389, 395.1, 370/395.2, 395.41, 395.4, 395.21; 379/111, 379/114.01, 114.06, 114.07; 455/403, 455/422.1, 450, 452.1, 452.2
See application file for complete search history.

(56) References Cited

U.S. PATENT DOCUMENTS

| | | | |
|---|---|---|---|
| 2003/0112821 A1* | 6/2003 | Cleveland et al. | 370/468 |
| 2007/0008883 A1 | 1/2007 | Kobayashi | |
| 2008/0101406 A1* | 5/2008 | Matoba | 370/468 |
| 2008/0107036 A1 | 5/2008 | Toyozumi et al. | |

FOREIGN PATENT DOCUMENTS

| | | |
|---|---|---|
| JP | 2004-080070 A | 3/2004 |
| JP | 2005-064648 A | 3/2005 |
| JP | 2008-141736 A | 6/2008 |
| WO | 2005/006664 A1 | 1/2005 |

\* cited by examiner

*Primary Examiner* — Fan Ng
(74) *Attorney, Agent, or Firm* — Mattingly & Malur, PC

(57) ABSTRACT

In communication using TCP, since the transmission bandwidth is significantly influenced by RTT and discard rate, there was a problem that only the transmission bandwidth significantly lower than the contracted bandwidth could be obtained under the environment such as WAN causing large RTT, large hop number and many discarded segments. There is provided an apparatus connected to a receiving side terminal having a means for feeding back to notify all discarded segments to an apparatus connected to a transmitting side terminal; a means for retransmitting the discarded segments fed back to be notified to the apparatus connected to the transmitting side terminal; and a means for controlling transmission bandwidth, based on retransmission bandwidth and discard bandwidth by the apparatus connected to the transmitting side terminal.

13 Claims, 36 Drawing Sheets

FIG. 2

TX ROUTE/SHAPER TABLE (106)

| TX ROUTE | | | | SHAPER |
|---|---|---|---|---|
| SOURCE IP/SUBNET | DESTINATION IP/SUBNET | SOURCE PORT | DESTINATION PORT | |
| 1.2.3.4 | 5.6.7.8 | 4200 | 25 | A |
| 1.2.3.4 | 5.6.7.8 | any | any | B |
| 1.2.3.0/24 | 5.6.7.0/24 | any | any | C |

FIG. 3

EACH SHAPER'S TRANSMISSION/RETRANSMISSION BANDWIDTH (114)

| SHAPER | STATISTICAL DATA BEFORE BASE TIME | | CONTROL BANDWIDTH (BEFORE BASE TIME) | BASE TIME | CONTROL BANDWIDTH (AFTER BASE TIME) | STATISTICAL DATA AFTER BASE TIME | |
|---|---|---|---|---|---|---|---|
| | TRANSMISSION BANDWIDTH | RETRANSMISSION BANDWIDTH | | | | TRANSMITTED BIT INTEGRATION VALUE | RETRANSMITTED BIT INTEGRATION VALUE |
| A | 100 | 0 | 100 | 15463 | 120 | 5216 | 0 |
| B | 200 | 20 | 160 | 15463 | 180 | 7608 | 0 |
| C | 300 | 100 | 220 | 15480 | 200 | 11080 | 512 |

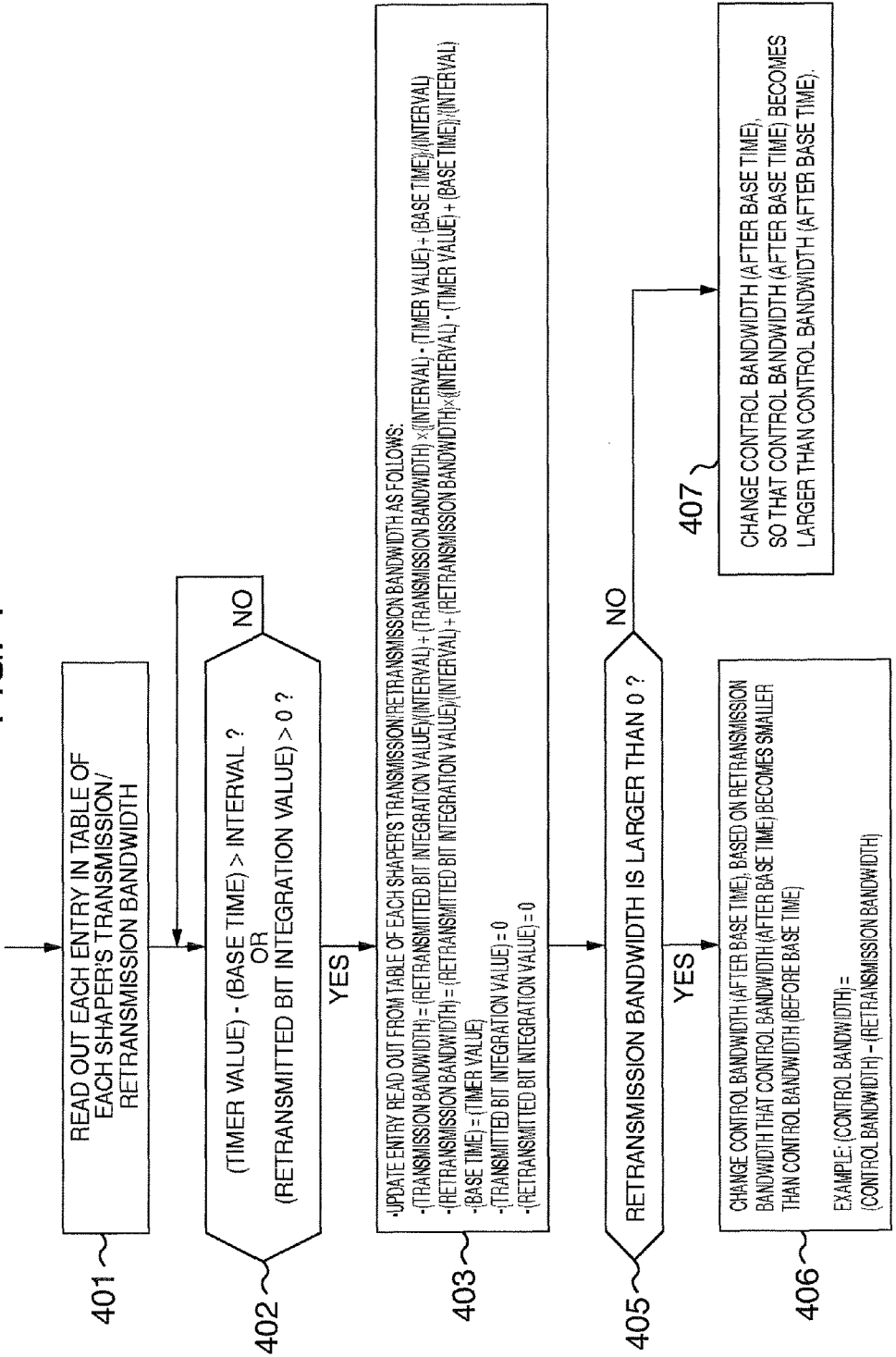

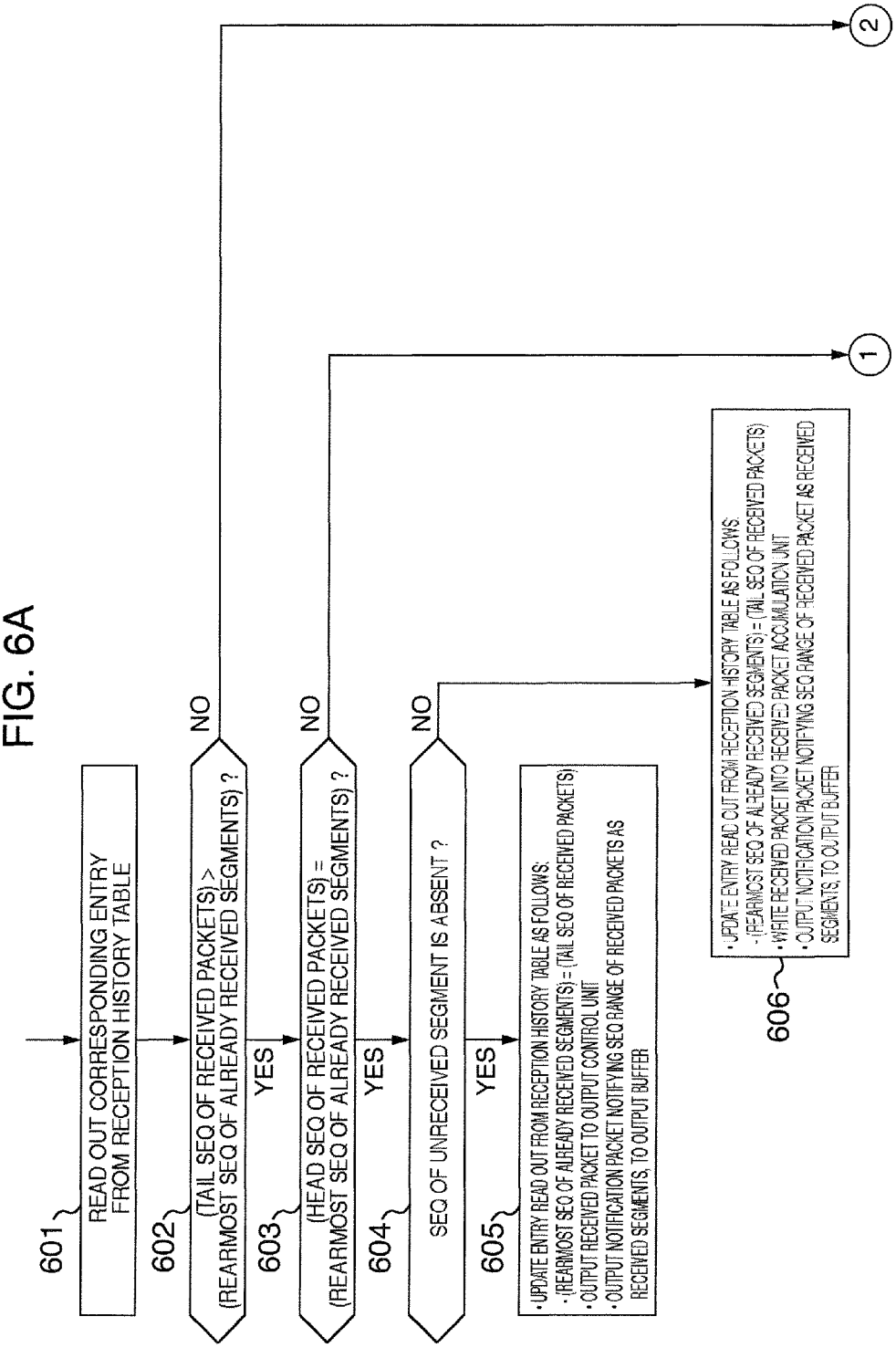

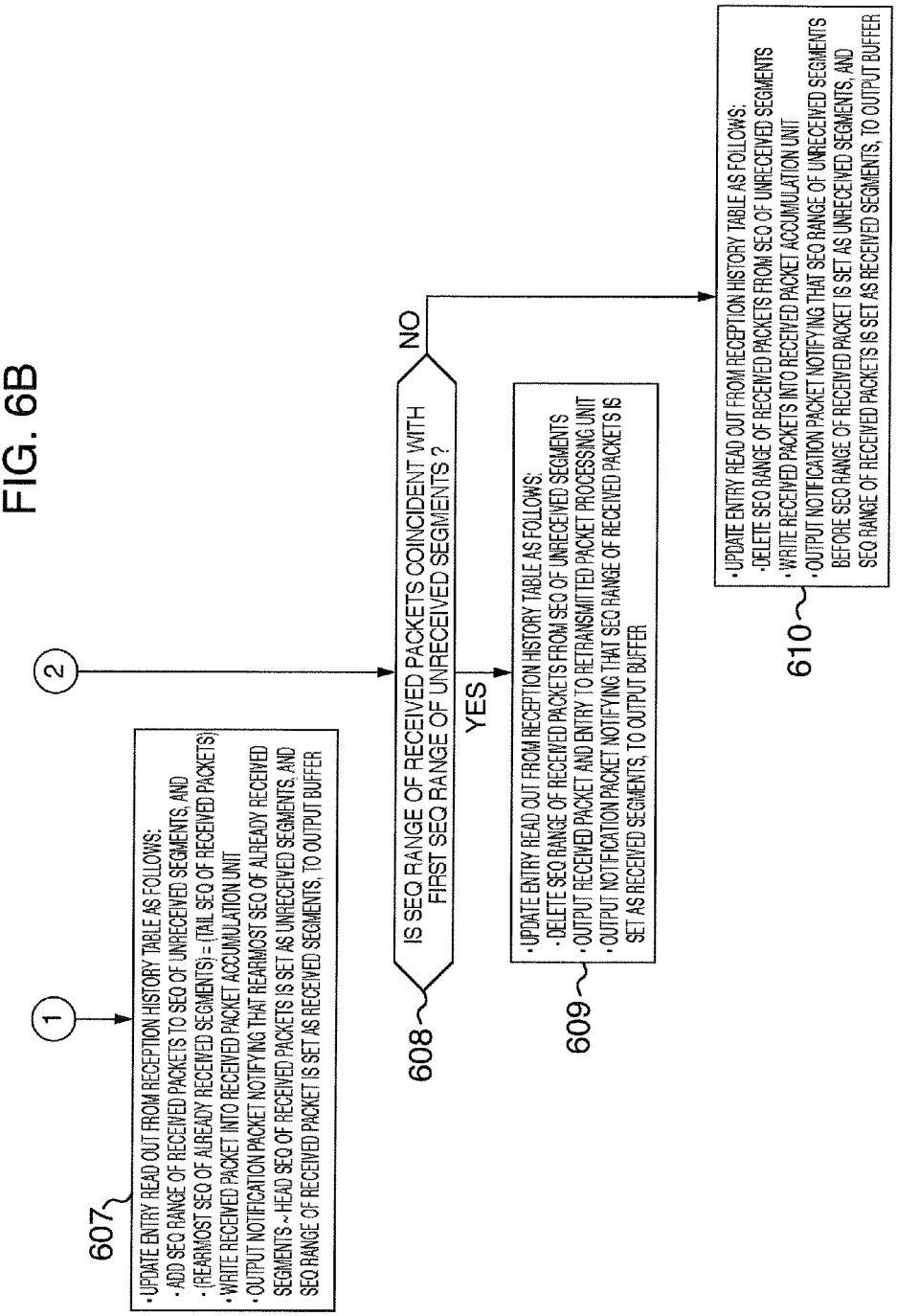

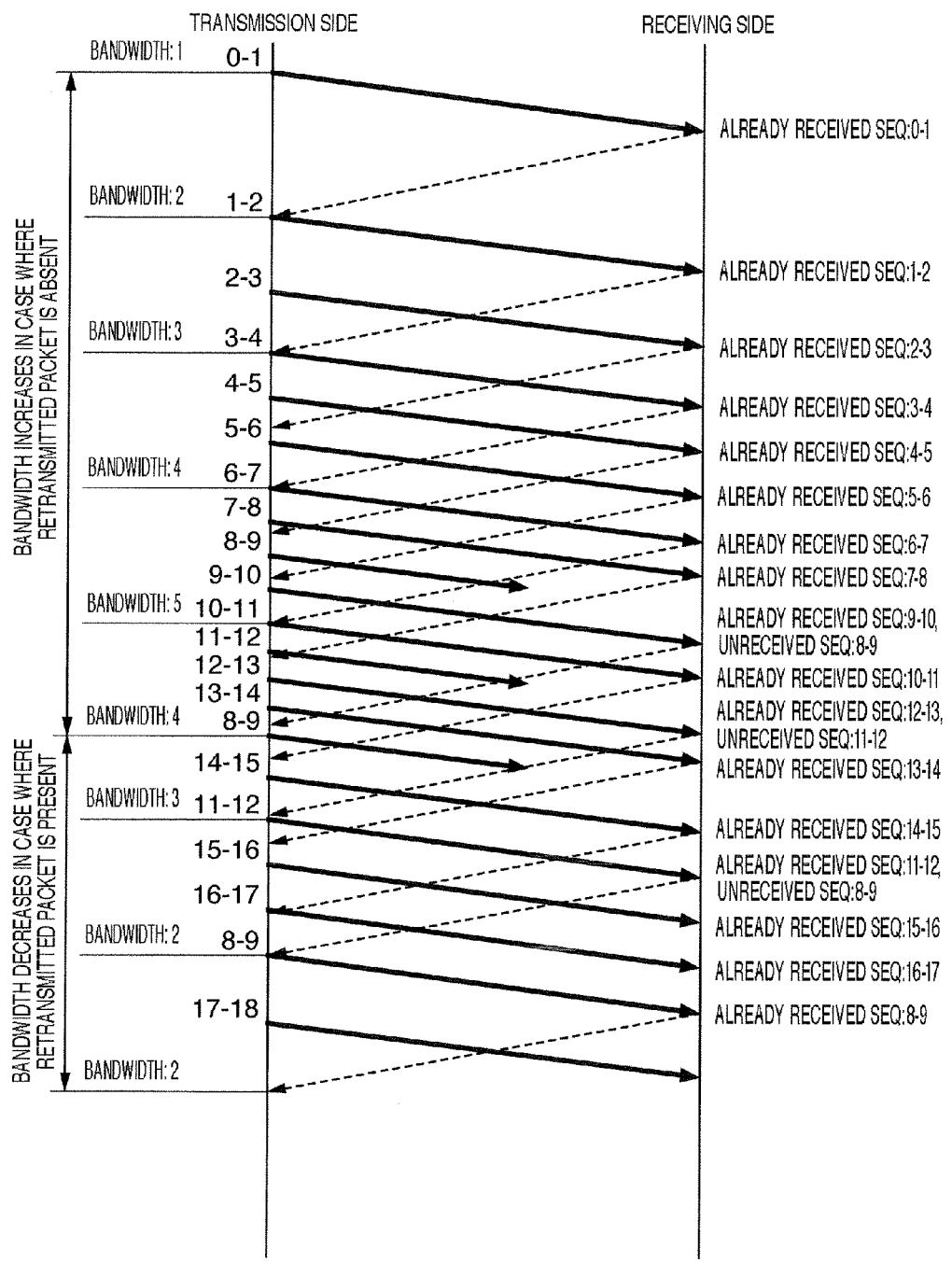

RX ROUTE/SHAPER TABLE

| RX ROUTE | | | | SHAPER |
|---|---|---|---|---|
| SOURCE IP/ SUBNET | DESTINATION IP/ SUBNET | SOURCE PORT | DESTINATION PORT | |
| 5.6.7.8 | 1.2.3.4 | 25 | 4200 | A |
| 5.6.7.8 | 1.2.3.4 | any | any | B |
| 5.6.7.0/24 | 1.2.3.0/24 | any | any | C |

FIG. 11

TABLE OF EACH SHAPER'S TRANSMISSION/DISCARD BANDWIDTH ⌐902

| SHAPER | STATISTICAL DATA BEFORE BASE TIME | | CONTROL BANDWIDTH (BEFORE BASE TIME) | BASE TIME | CONTROL BANDWIDTH (AFTER BASE TIME) | STATISTICAL DATA AFTER BASE TIME | |
|---|---|---|---|---|---|---|---|
| | TRANSMISSION BANDWIDTH | DISCARD BANDWIDTH | | | | TRANSMITTED BIT INTEGRATION VALUE | DISCARDED BIT INTEGRATION VALUE |
| A | 100 | 0 | 100 | 15463 | 120 | 5216 | 0 |
| B | 200 | 20 | 160 | 15463 | 180 | 7608 | 0 |
| C | 300 | 100 | 220 | 15480 | 200 | 11080 | 512 |

CONNECTION PRESENCE/ABSENCE TABLE

| SOURCE IP | DESTINATION IP | SOURCE PORT | DESTINATION PORT | IN RETRANSMISSION | BASE TIME |
|---|---|---|---|---|---|
| 1.2.3.4 | 5.6.7.8 | 4200 | 25 | 0 | 15463 |
| | | | | | |
| | | | | | |

FIG. 15

TABLE OF EACH SHAPER'S RETRANSMITTING CONNECTION NUMBER 1203

| SHAPER | STATISTICAL DATA BEFORE BASE TIME | | BASE TIME | STATISTICAL DATA AFTER BASE TIME | |
|---|---|---|---|---|---|
| | TRANSMITTING CONNECTION NUMBER | RETRANSMITTING CONNECTION NUMBER | | TRANSMITTING CONNECTION NUMBER INTEGRATION VALUE | RETRANSMITTING CONNECTION NUMBER INTEGRATION VALUE |
| A | 10 | 0 | 15463 | 5 | 0 |
| B | 20 | 0 | 15463 | 7 | 0 |
| C | 30 | 2 | 15480 | 15 | 1 |

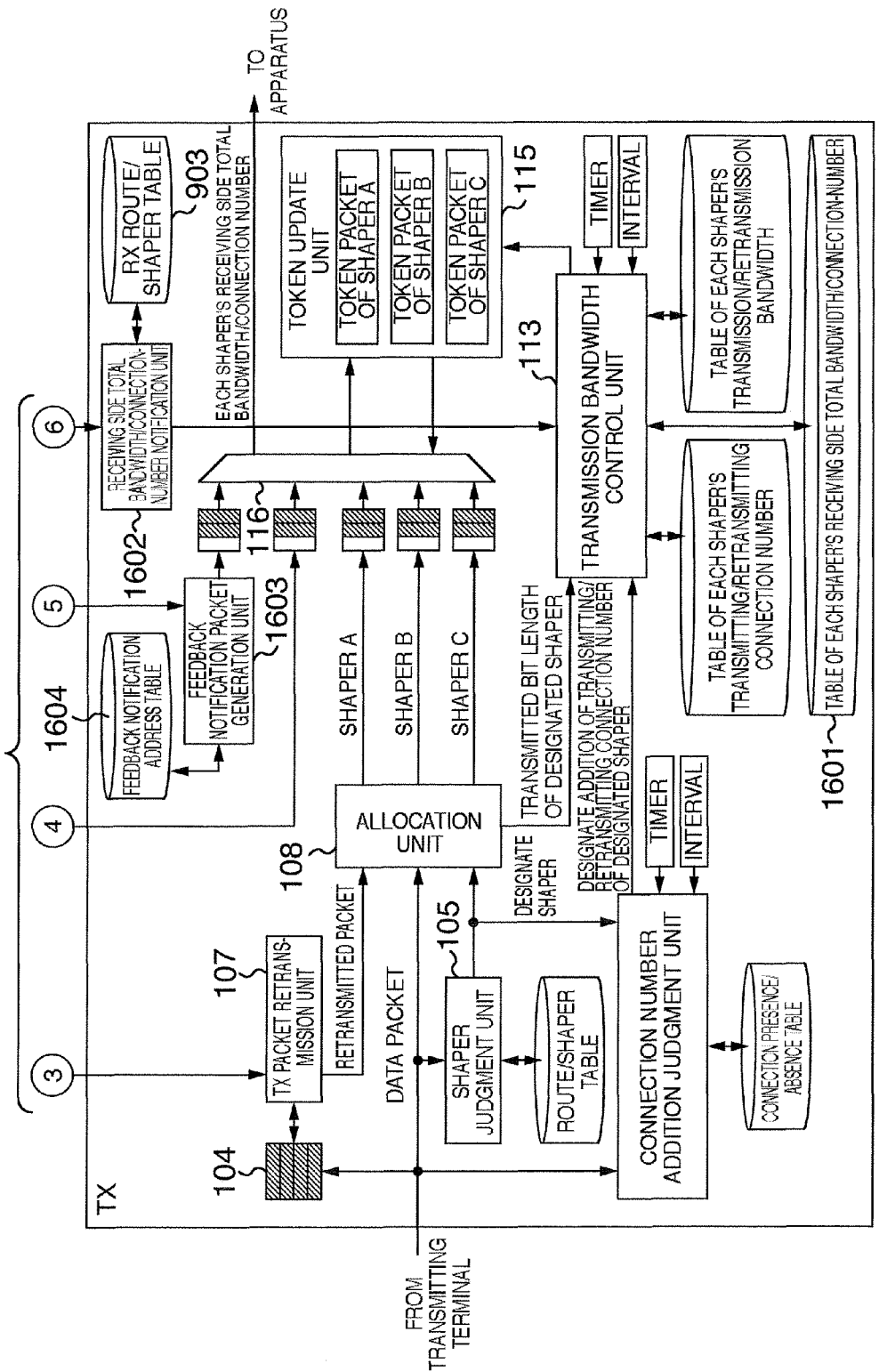

TABLE OF EACH SHAPER'S RECEIVING SIDE
TOTAL BANDWIDTH/CONNECTION-NUMBER

| SHAPER | RECEIVING SIDE TOTAL BANDWIDTH | RECEIVING SIDE TOTAL CONNECTION NUMBER |
|---|---|---|
| A | 100 | 10 |
| B | 120 | 20 |
| C | 140 | 30 |

FEEDBACK NOTIFICATION ADDRESS TABLE

| (DESTINATION IP)/ SUBNET |
|---|
| 5.6.7.8 |
| 5.6.7.0/24 |
|  |

TABLE OF RX TOTAL BANDWIDTH/CONNECTION-NUMBER

| STATISTICAL DATA BEFORE BASE TIME | | BASE TIME | STATISTICAL DATA AFTER BASE TIME | |
|---|---|---|---|---|
| RX TOTAL BANDWIDTH | RX TOTAL CONNECTION NUMBER | | RX TOTAL BIT INTEGRATION VALUE | RX TOTAL CONNECTION NUMBER INTEGRATION VALUE |
| 100 | 20 | 15463 | 120 | 10 |

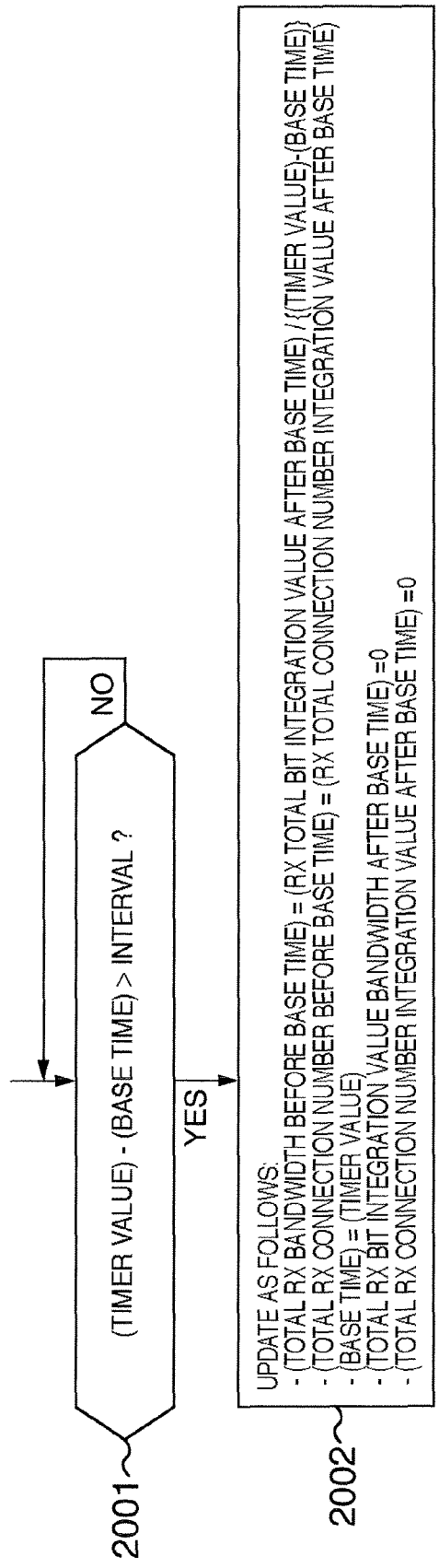

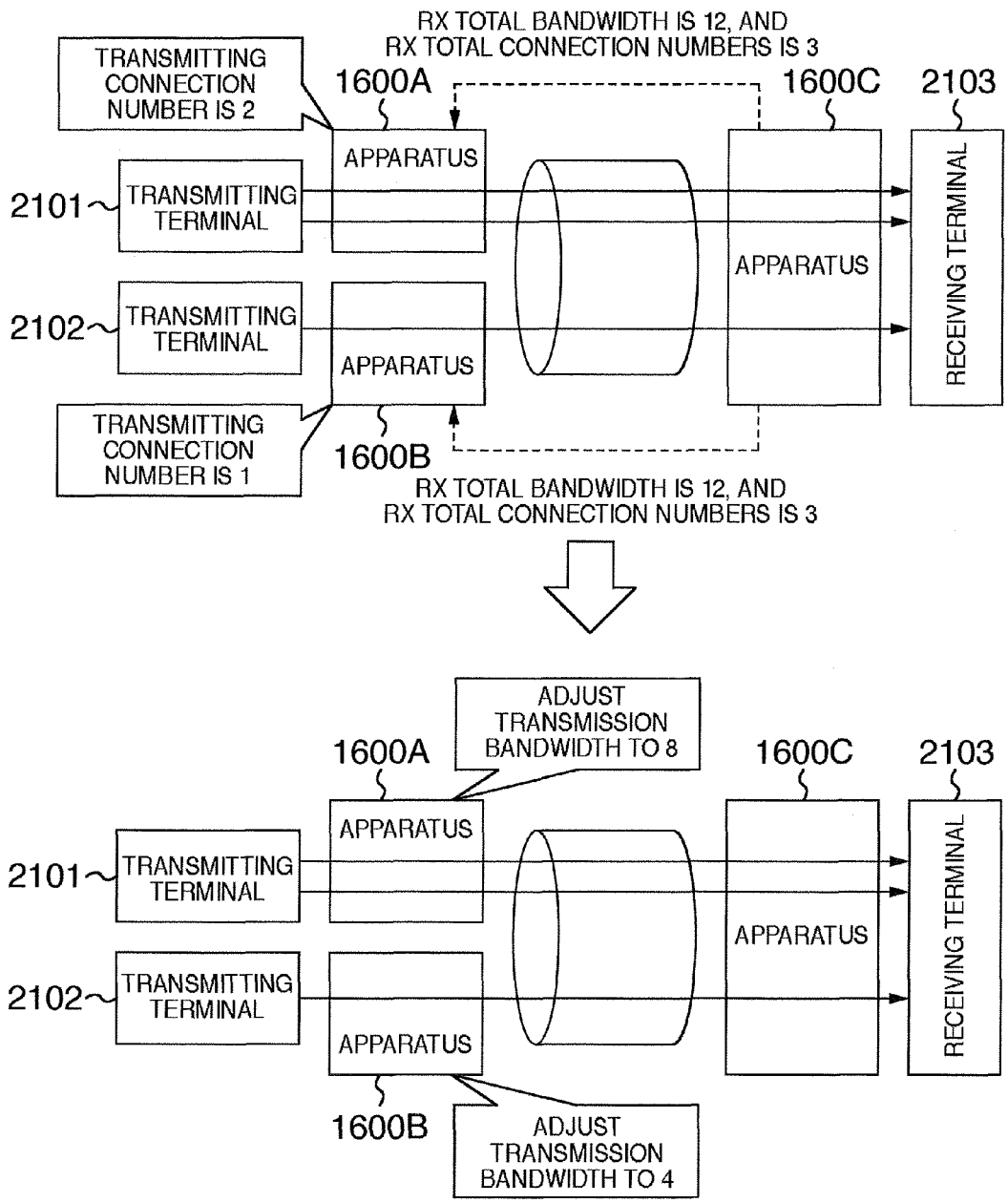

FIG. 25

TABLE OF EACH COMMUNICATION ROUTE'S TRANSMITTING CONNECTION NUMBER OF OWN APPARATUS AND OTHER APPARATUSES ⟋2401

| COMMUNICATION ROUTE | STATISTICAL DATA BEFORE BASE TIME | | BASE TIME | STATISTICAL DATA AFTER BASE TIME | |
|---|---|---|---|---|---|
| | TRANSMITTING CONNECTION NUMBER | | | TRANSMITTING CONNECTION NUMBER INTEGRATION VALUE | |
| | OWN APPARATUS | OTHER APPARATUSES | | OWN APPARATUS | OTHER APPARATUSES |
| A | 10 | 20 | 15463 | 5 | 10 |
| B | 20 | 40 | 15463 | 7 | 20 |
| C | 30 | 50 | 15480 | 15 | 12 |

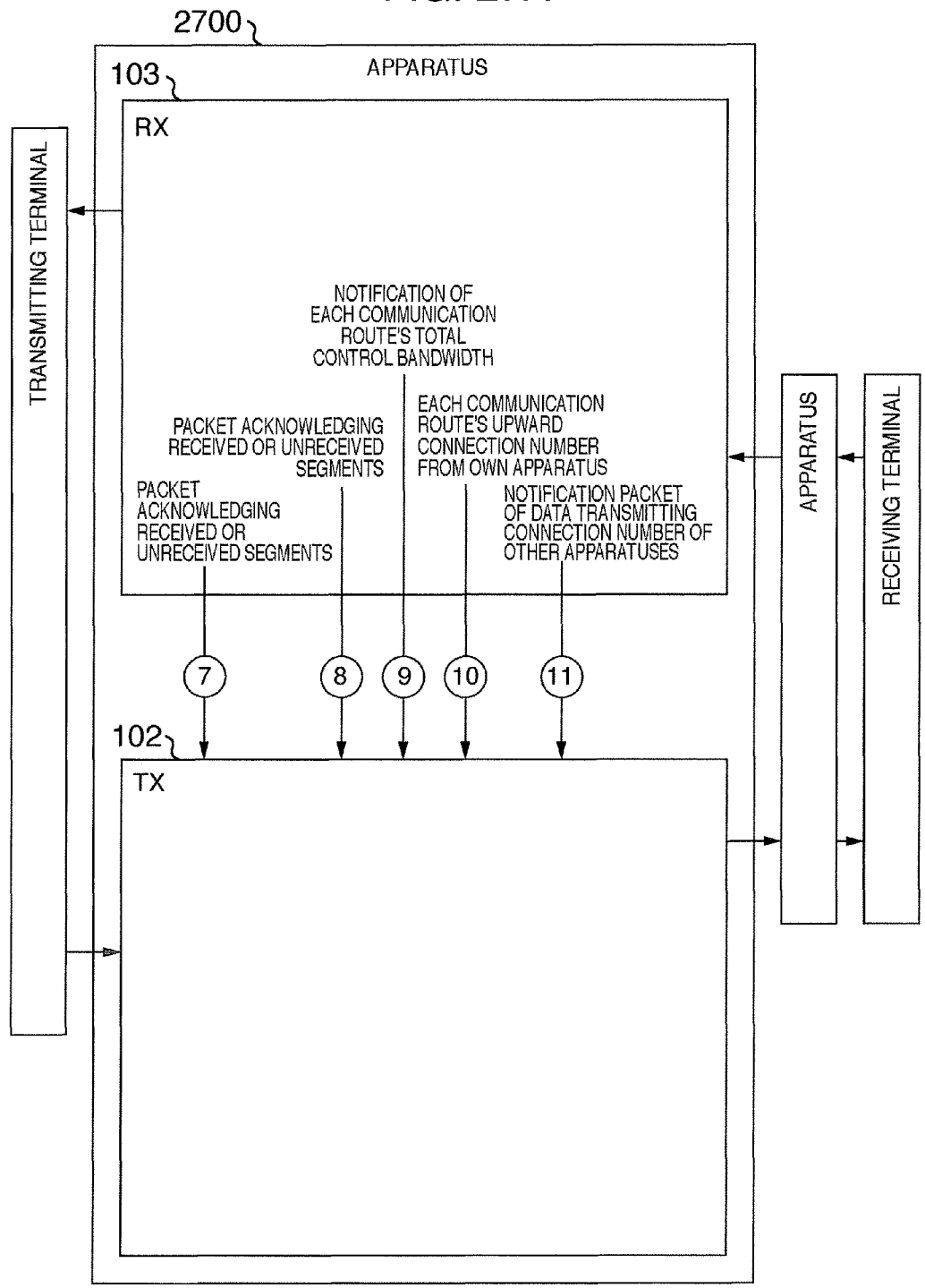

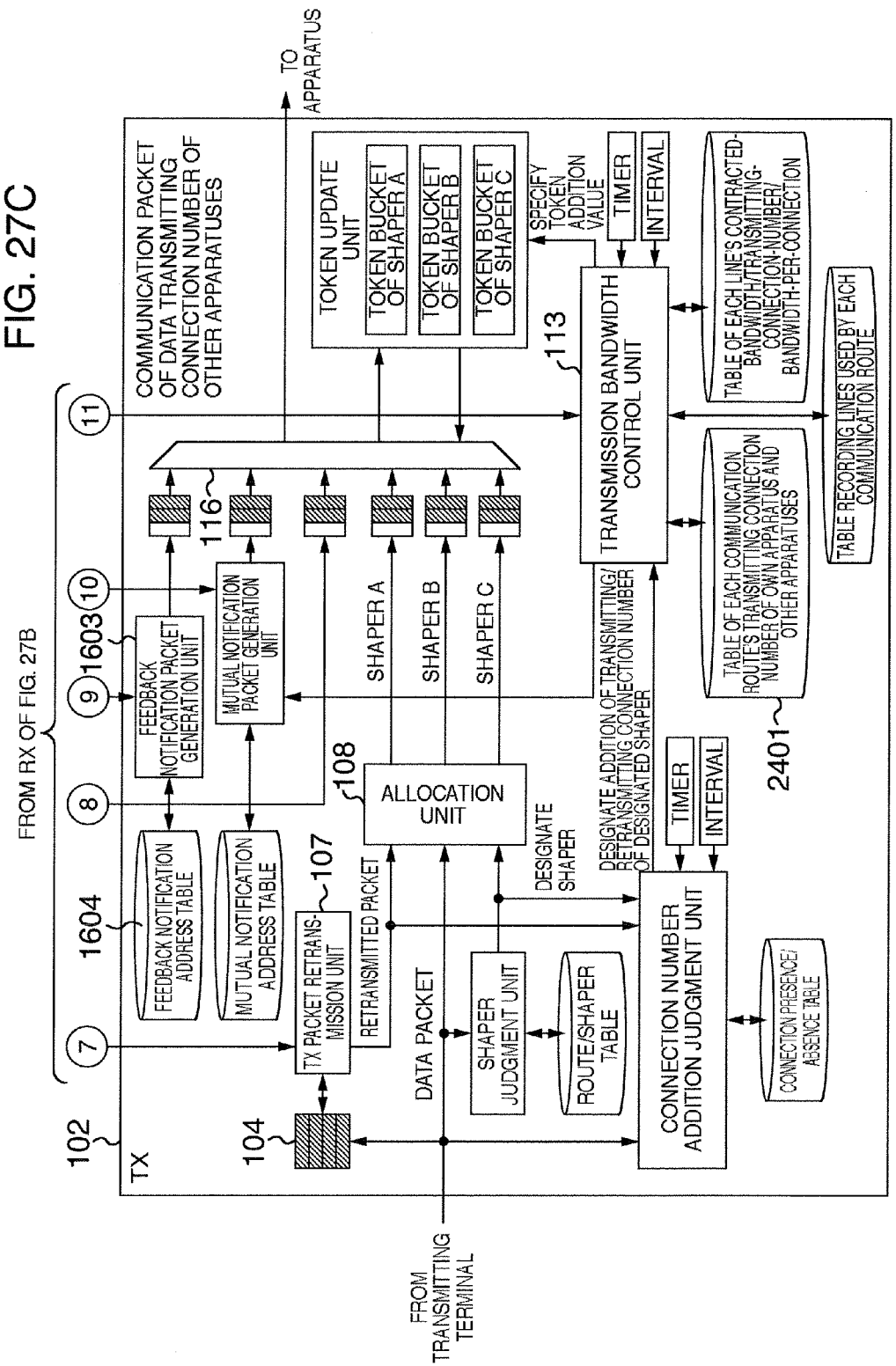

FIG. 28

TABLE OF EACH COMMUNICATION ROUTE'S RECEIVING CONNECTION NUMBER OF OWN APPARATUS AND OTHER APPARATUSES

2701

| COMMUNICATION ROUTE | STATISTICAL DATA BEFORE BASE TIME | | BASE TIME | STATISTICAL DATA AFTER BASE TIME | |
|---|---|---|---|---|---|
| | RECEIVING CONNECTION NUMBER | | | RECEIVING CONNECTION NUMBER INTEGRATION VALUE | |
| | OWN APPARATUS | OTHER APPARATUSES | | OWN APPARATUS | OTHER APPARATUSES |
| A | 10 | 20 | 15463 | 5 | 10 |
| B | | | | | |
| C | | | | | |

US 8,605,745 B2

COMMUNICATION APPARATUS AND COMMUNICATION SYSTEM FOR ENHANCING SPEED OF COMMUNICATIONS BETWEEN TERMINALS

INCORPORATION BY REFERENCE

The present application claims priority from Japanese Patent Application No. 2009-214015, filed on Sep. 16, 2009, and the content of which is incorporated by reference into the present application.

TECHNICAL FIELD

The present invention relates to a communication apparatus and a communication system, and in particular, relates to an apparatus and a system for performing bandwidth control.

BACKGROUND ART

It has become general to use WAN (Wide Area Network) utilizing IP-VPN technology or the like, as a communication network between global bases.

In the case where a certain terminal at a certain base communicates with a certain terminal at a different overseas base, communication is performed via a line connecting one's own base LAN with a domestic WAN, a line connecting a domestic WAN with an overseas WAN, and a line connecting an overseas WAN with another base LAN. These lines are limited in available bandwidth width, based on contracted bandwidth.

It is general to use TCP in communication between terminals. In TCP communication, an amount of data already received by a receiving terminal is fed back to be notified to a transmitting terminal, the data being sent by the transmitting terminal. When the amount of the already received data to be fed back to be notified stops increasing, the transmitting terminal judges it as discard detection.

Further, the transmitting terminal manages a parameter called a window size (a transmittable data size even when the fact of reception is not acknowledged from the receiving terminal), and changes the window size in response to RTT (Round Trip Time) or presence or absence of discard detection.

By decreasing the window size when the network is judged busy during increasing in RTT or in discard detection, the transmission bandwidth is decreased indirectly to avoid network congestion. In addition, by increasing the window size when decreasing in RTT or absence of discard detection, the network is judged vacant and the transmission bandwidth is increased indirectly so that the line bandwidth of the network is effectively utilized. In this way, in communication using TCP, the transmission bandwidth is significantly influenced by RTT and discard rate.

As technology similar to communication using TCP, there is also communication using ABR of ATM. In this communication, in addition to RTT or discard, the receiving bandwidth is fed back to be notified from the receiving terminal to the transmitting terminal.

In addition to RTT and discard detection, there is also technology of direct bandwidth control using a connection number (PATENT LITERATURE 1).

CITATION LIST

Patent Literature

PATENT LITERATURE 1: WO 05/006664

SUMMARY OF INVENTION

Technical Problem

In communication using TCP, since the transmission bandwidth is significantly influenced by RTT and discard rate, only the transmission bandwidth significantly lower than the contracted bandwidth can be obtained under the environment such as WAN causing large RTT, large hop number and many discarded segments.

Solution to Problem

To solve the above problem, in one aspect of the present invention, there is provided an apparatus connected to a receiving side terminal having a means for feeding back to notify all discarded segments to an apparatus connected to a transmitting side terminal; a means for retransmitting the discarded segments fed back to be notified to an apparatus connected to the transmitting terminal; and a means for the apparatus connected to the transmitting terminal controlling transmission bandwidth, based on retransmission bandwidth and discard bandwidth.

Advantageous Effect of Invention

According to the above aspect of the present invention, the transmission bandwidth becomes not significantly influenced by RTT and discard rate, and thus the transmission bandwidth is improved under the environment such as WAN causing large RTT, large hop number and many discarded segments.

Other objects, features and advantages of the present invention will become apparent from the following description of embodiments of the present invention taken into conjunction with the accompanying drawings.

BRIEF DESCRIPTION OF DRAWINGS

FIG. 2 shows a format of a TX route shaper table 106.

FIG. 3 shows a format of a table of each shaper's transmission/retransmission bandwidth 114.

FIG. 4 is a flow chart of updating a table of each shaper's transmission/retransmission bandwidth 114.

FIG. 6A is a flow chart of updating a reception history table 114.

FIG. 6B is a flow chart of updating a reception history table 114.

FIG. 7 shows an example of a transmission/reception sequence of a data packet and a packet acknowledging received or unreceived segments, at a transmission side apparatus and a receiving side apparatus.

FIG. 10 shows a format of an RX route/shaper table 903.

FIG. 11 shows a format of a table of each shaper's transmission/discard bandwidth 902.

FIG. 13 shows a format of a connection presence/absence table 1202.

FIG. 15 shows a format of a table of each shaper's transmitting/retransmitting connection number 1203.

FIG. 16C is a block diagram of an apparatus 1600 performing bandwidth control based on total packet receiving connection number notified from a communication partner.

FIG. 17 shows a format of a table of each shaper's receiving side total bandwidth/connection-number 1601.

FIG. 18 shows a format of a feedback notification address table 1604.

FIG. 19 shows a format of an RX total bandwidth/connection-number table 1606.

FIG. 20 is a flow chart of updating an RX total bandwidth/connection-number table 1606.

FIG. 21 is an explanatory diagram of bandwidth control.

FIG. 25 shows a format of a table of each communication route's transmitting connection number of one's own apparatus and other apparatuses 2401.

FIG. 27A is a block diagram of an apparatus 2700 performing bandwidth control based on contracted bandwidth, packet receiving connection number of own apparatus and contracted bandwidth per connection of a line used by a communication route from a receiving terminal to a transmitting terminal, as well as based on packet receiving connection number of other apparatuses.

FIG. 27C is a block diagram of an apparatus 2700 performing bandwidth control based on contracted bandwidth, packet receiving connection number of one's own apparatus and contracted bandwidth per connection of a line used by a communication route from a receiving terminal to a transmitting terminal as well as packet receiving connection number of other apparatuses.

FIG. 28 shows a format of a table of each communication route's receiving connection number of one's own apparatus and other apparatuses 2701.

DESCRIPTION OF EMBODIMENTS

Figure 1:
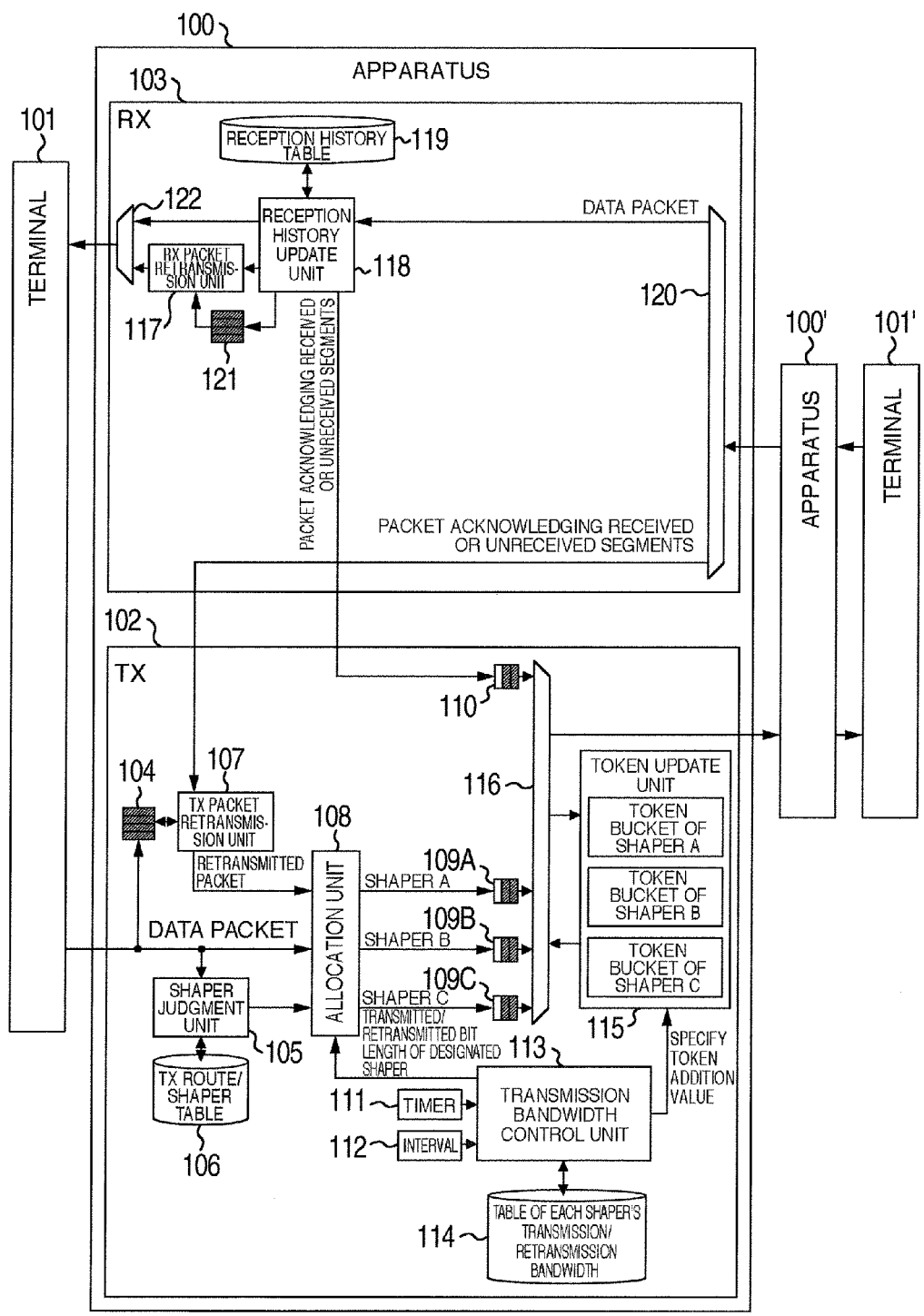
FIG. 1 is a block diagram of an apparatus 100 for performing bandwidth control, based on retransmission bandwidth.

Explanation will be given on typical aspects for carrying out the present invention, as follows.

Firstly, one aspect is provided with a means for an apparatus connected to a receiving terminal feeding back to notify all discarded segments to an apparatus connected to a transmitting terminal; a means for retransmitting the discarded segments fed back to be notified to the an apparatus connected to the transmitting terminal; and a means for the apparatus connected to the transmitting terminal controlling the transmission bandwidth based on a retransmission bandwidth or a discard bandwidth. By this aspect, such a problem is solved that, in communication using TCP, since a transmission bandwidth is significantly influenced by RTT and discard rate, only transmission bandwidth significantly lower than contracted bandwidth could be obtained under the environment such as WAN causing large RTT, large hop number and many discarded segments. The present aspect provides effect that a transmission bandwidth becomes not significantly influenced by RTT and discard rate, and thus a transmission bandwidth is improved under the environment such as WAN causing large RTT, large hop number and many discarded segments. Details of the present aspect will be described later mainly in Embodiments 1 to 3.

As another aspect, the apparatus connected to the transmitting terminal is provided with a means for measuring, in real time, retransmitting connection number of a discarded segment, and a means for controlling a transmission bandwidth based on retransmitting connection number. By this aspect, such a problem is solved that, in technology for directly controlling a bandwidth using connection number other than RTT and discard detection, real time reflection of a communication status of practical connection is difficult, and that it is not understood in what percent of connections has been discarded in discard detection and thus in what degree the bandwidth should be reduced. The means for performing bandwidth control based on retransmitting connection number grasped by the present aspect, provides understanding in what percent of connections has been discarded in discard detection, and thus has such effect as it becomes clear in what degree the bandwidth should be reduced. Details of the present aspect will be described later mainly in Embodiment 4.

Further, as another aspect, an apparatus connected to a terminal is provided with a means for performing bandwidth control based on a real time utilization status such as contracted bandwidth/connection-number of a line used for connecting a network with another one (one's own base LAN with a domestic WAN, a domestic WAN with an overseas WAN, an overseas WAN with another base LAN, or the like). By this aspect, such a problem is solved that communication quality obtained varies depending on communication environment, because communication is performed only by estimating communication environment between a transmitting terminal and a receiving terminal, based on RTT and discard detection, and there is no means for directly reflecting communication environment. The means for performing bandwidth control based on a use status of a line grasped by the present aspect, has such effect that constant communication quality is obtained irrespective of communication environment. Details thereof will be described in Embodiments 5 to 12.

In addition, as another aspect, there is provided a means for performing transmission bandwidth control based on data receiving connection number notified from a communication partner. Details will be described mainly in Embodiment 5 (Embodiment 5). As another aspect, there is provided a means for performing bandwidth control based on contracted-bandwidth/data-transmitting-connection-number/bandwidth-per-connection of a line used by a communication route. Details will be described mainly in Embodiment 6. As another aspect, there is provided a means for performing bandwidth control based on contracted-bandwidth/data-transmitting-connection-number/bandwidth-per-connection of a line used by a communication route put together by mutual notification among a plurality of apparatuses. Details will be described mainly in Embodiment 7. As another aspect, there is provided a means for performing bandwidth control based on contracted bandwidth/data receiving connection number/bandwidth per connection of a line used by a communication put together by mutual notification among a plurality of apparatuses. Details will be described mainly in Embodiment 8. Explanation will be given on other aspects of the present invention in various Embodiments to be described later.

Description will be given below in detail of the configuration of an apparatus for performing bandwidth control or an apparatus for performing packet processing, or a system configured by connecting the relevant apparatuses via a network, using embodiments, to explain the aspects of the present invention in more detail. In addition, to explain the aspects of the present invention in detail using the following embodiments, description will be given below mainly on bandwidth control and retransmission control processing performed when a communication terminal communicates with another communication terminal, so that a plurality of apparatuses installed among a plurality of communication terminals can attain high communication speed.

Embodiment 1

An Embodiment of an apparatus 100 for performing bandwidth control based on a retransmission bandwidth, is explained with reference to FIG. 1, FIG. 2, FIG. 3, FIG. 4, FIG. 5, FIG. 6, and FIG. 7.

FIG. 1 shows a block diagram of the apparatus 100. The apparatus 100 comprises a TX unit 102 for receiving a data transmitted by a terminal 101, and for transmitting a packet toward other apparatus 100', and an RX unit 103 for receiving a packet from other apparatus 100', and outputting the data to the terminal 101.

The TX unit 102 comprises a transmission packet accumulation unit 104, an output destination judgment unit 105, a TX route/shaper table 106, a TX packet retransmission unit 107, an allocation unit 108, a shaper 109, a buffer 110 for packets acknowledging received or unreceived segments, a timer value storing unit 111, an interval time storing unit 112, a transmission bandwidth control unit 113, a table of each shaper's transmission and retransmission bandwidth 114, a token update unit 115, and a transmitted packet output control unit 116.

The RX unit 103 comprises an RX packet retransmission unit 117, a reception history update unit 118, a reception history table 119, an RX side allocation unit 120 for allocating a data packet received from the other apparatus 100' to the reception history update unit 118, and a packet acknowledging received or unreceived segments to the TX side packet retransmission unit 107, a received packet accumulation unit 121, and a received packet output control unit 122.

A data packet that the terminal 101 transmits, is accumulated in the transmission packet accumulation unit 104, and input to the output destination judgment unit 105 and the allocation unit 108.

The data packet accumulated in the transmission packet accumulation unit 104, is deleted, when the packet acknowledging received segments is received from the apparatus 101' to be received by the TX packet retransmission unit 107 via the RX side allocation unit 120, and read out to be retransmitted, when the packet acknowledging unreceived segments is received by the TX side packet retransmission unit 107.

Figure 35:
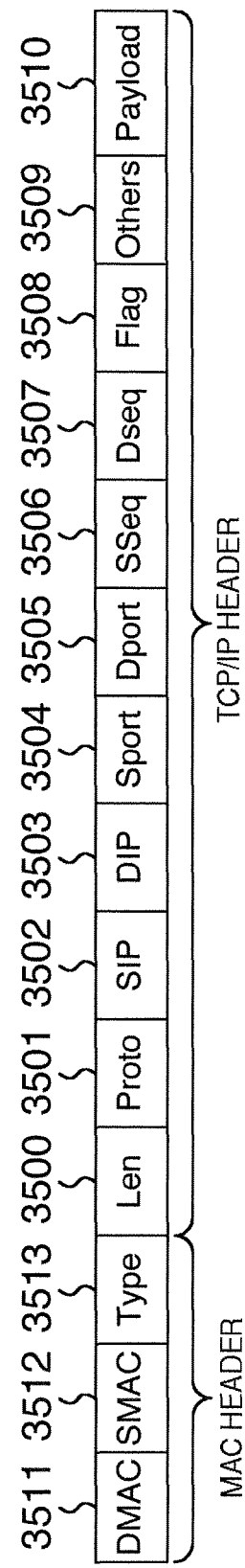
FIG. 35 shows a format of a packet data input and output by an apparatus.

FIG. 35 represents a format of a packet data to be input and output by an apparatus.

The packet data includes Len 3500, Proto 3501, SIP 3502, DIP 3503, Sport 3504, Dport 3505, SSEQ 3506, DSEQ 3507, Flag 3508, Others 3509, Payload 3510, DMAC 3511, SMAC 3512, and Type 3513.

The Len 3500 stores packet length of an IP layer. Proto 3501 stores an identification number for identifying a protocol of a transport layer. SIP 3502 stores a source address, that is, an address of a transmitting terminal. DIP 3503 stores a destination IP address, that is, an address of a receiving terminal. Sport 3504 stores a source port of TCP. Dport 3505 stores a destination port of TCP. SSEQ 3506 stores source sequence number. DSEQ 3507 stores destination sequence number. Flag 3508 stores a TCP flag number. Others 3509 store other IP/TCP header data. Payload 3510 stores a data other than a packet header. DMAC 3511 stores a destination MAC address of a physical layer. SMAC 3512 stores a source MAC address of the physical layer. Type 3513 represents a type of packet data. It should be noted that MAC represents Media Access Control Frame, and a packet flowing the physical layer is called MAC frame.

FIG. 2 shows is a format of a TX route/shaper table 106. The TX route/shaper table 106 comprises the TX route (a source IP/subnet, a destination IP/subnet, a source port, a destination port) and a plurality of entries for storing shapers.

The shaper judgment unit 105 reads out an entry having a route coincident with the packet header from the TX route/shaper table 106, and notifies a shaper described in the entry to the allocation unit 108.

The allocation unit 108 allocates the input packet to any of a shaper A (109A), a shaper B (109B), or a shaper C (109C), based on the notification. Further, it converts the packet length described in the packet header to a bit value, associates it with a shaper and transmitted/retransmitted bits to notify it to the transmission bandwidth control unit 113.

The transmission bandwidth control unit 113 updates the table of each shaper's transmission/retransmission bandwidth 114, based on the shaper and the transmitted/retransmitted bits notified from the allocation unit 108, and determines control bandwidth of each shaper based on updated result. Further, it notifies a token addition value corresponding to the control bandwidth to the token update unit 115.

FIG. 3 shows a format of the table of each shaper's transmission/retransmission bandwidth 114. It is composed a plurality of entries for storing base time, a control bandwidth (before base time), a control bandwidth (after base time), statistical data before base time (transmission bandwidth, and retransmission bandwidth), and statistical data after base time (transmitted bit integration value, and retransmitted bit integration value), with respect to each shaper.

The transmission bandwidth control unit 113 of FIG. 1 adds the notified transmitted/retransmitted bits to the statistical data after base time (transmitted bit integration value, and retransmitted bit integration value) of the entry coincident with the shaper notified from the allocation unit 108.

Further, the transmission bandwidth control unit 113 updates the table of each shaper's transmission/retransmission bandwidth 114 according to the flow chart shown in FIG. 4.

The transmission bandwidth control unit 113 reads out each entry of the table of each shaper's transmission/retransmission bandwidth 114 (step 401) to perform judgment on whether the difference between the timer value 111 and the base time is larger than the interval time 112, or an retransmitted bit integration value is larger than 0, the judgment being repeated until the judgment condition is satisfied (step 402). When the judgment condition is satisfied, the entry is updated so as to satisfy (transmission bandwidth)=(retransmitted bit integration value)/(interval)+(transmission bandwidth)×{(interval)−(timer value)+(base time)}/(interval), (retransmission bandwidth)=(integration value of retransmission bit)/(interval)+(retransmission bandwidth)×{(interval)−(timer value)+(base time)}/(interval), (base time)=(timer value), (transmission bit integration value)=0, and (retransmitted bit integration value)=0 (step 403). Further, it is judged whether or not an already updated retransmission bandwidth is larger than 0 (step 405). When it is judged to be larger, a control bandwidth (after base time) is changed based on the retransmission bandwidth so that the control bandwidth (after base time) becomes smaller than the control bandwidth (before base time) (for example, {control bandwidth (after base time)}={control bandwidth (before base time)}−(retransmission bandwidth) (step 406). When it is judged to be smaller, the control ban is changed so that the control bandwidth (after base time) becomes larger than the control bandwidth (after base time) (step 407).

The transmission bandwidth control unit 113 notifies an addition token calculated based on the above already changed control bandwidth (after base time) to the token control unit 115.

The token control unit 115 adds periodically an addition token notified from the transmission bandwidth control unit 113 to a token bucket, based on token bucket algorithm. Further, when token integration value is over a certain value, it is notified to the transmitted packet output control unit 116 that it is allowed to be output.

The transmitted packet output control unit 116 reads out a packet from a buffer which accumulates the packet and is allowed to output it, and outputs it. In the case of outputting from any of the shaper A (109A), the shaper B (109B) or the shaper C (109C), the shaper and the output packet length are notified to the token control unit 115. The token control unit 115 subtracts a token corresponding to the acknowledging packet length from the token bucket of the notified shaper.

A data packet received by the apparatus 100' from the apparatus 100 is input to the reception history update unit 118' by the RX side allocation unit 120'.

The reception history update unit 118' performs processing shown by the flow chart of FIG. 6, based on the received data packet and the content of the reception history table 119'.

Figure 5:
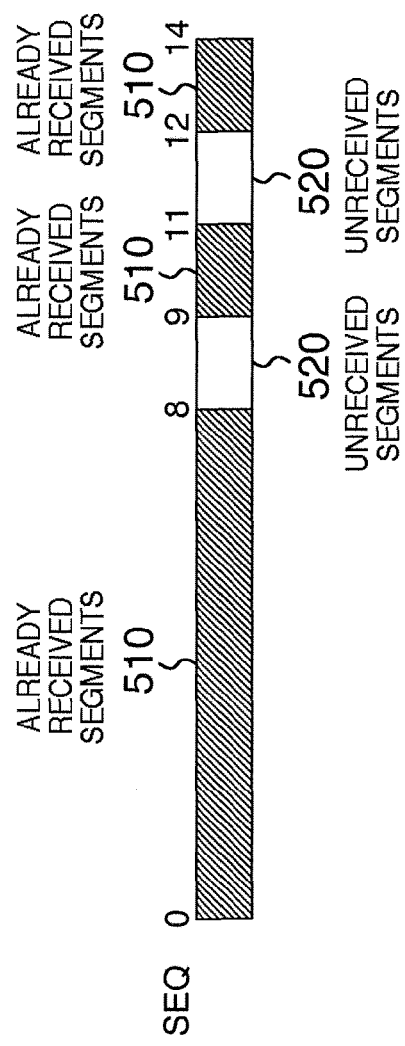
FIG. 5 shows a format of a reception history table 114, and the relation among an already received segment, an unreceived segment and SEQ number.

FIG. 5 represents a format of a reception history table 114' and relation among already received segments 510, unreceived segments 520, and SEQ numbers 0, 8, 9, 12 and 14.

Reception history table 114' is composed of a source IP, a destination IP, a source port, a destination port, the rearmost SEQ of the already received segments, a SEQ of the unreceived segments, and a discard detection time. The SEQ represents a byte number from the head of the received data.

The reception history update unit 118' reads out an entry coincident with a value described in a received packet header from the reception history record table 119' (step 601). It judges whether or not the tail SEQ of a data included by the received packet is larger than the rearmost SEQ of the already received segments described in the entry (step 602). When it judges that it is larger, it judges whether or not the head SEQ of the data included in the received packet coincides with the rearmost SEQ of the already received segments described in the entry, (step 603). When it judges that it does, it judges whether or not the SEQ of the unreceived segments is described in the entry (step 604). When it is not described, the entry is updated as (rearmost SEQ of already received segments)=(tail SEQ of data included in received packets), and the received packet are output to the received packet output control unit 122'. Further, a packet acknowledging as received segments a SEQ range of data included in the received packets, is output to the buffer 110' (step 605).

In the case where it is judged "No", in the step 604 of FIG. 6, the entry is updated as (rearmost SEQ of already received segments)=(tail SEQ of data included in received packets), and the received packets is written into the received packet accumulation unit 121'. Further, a packet acknowledging as received segments an SEQ range of data included by the received packet, is output to the buffer 110' (step 606).

In the case where it is judged "not coincident" in the step 603 of FIG. 6, a SEQ range of the received packets is added to an SEQ of an unreceived segments in the entry, the entry is updated as (rearmost SEQ of already received segments)=(tail SEQ of the received packets), and the received packets are written into the received packet accumulation unit 121'. Further, a packet acknowledging that the range from the last SEQ of the already received segments to the head SEQ of the received packets is set as unreceived segments, and the SEQ range of the received packets is output to the buffer 110' as received segments (step 607).

In the case where it is judged "not larger" in the step 602 of FIG. 6, it is judged whether or not the SEQ range of the data included by the received packets is coincident with the first SEQ range of the unreceived segments described in the entry (step 608).

In the case where it is judged "coincident" in the step 608 of FIG. 6, the entry is updated so that the SEQ range of the received packets is deleted from the SEQ of the unreceived segments, and the received packets and the entry are output to the RX packet retransmission unit 117'. Further, a packet for acknowledging as received segments a SEQ range of data included in the received packets, is output to the buffer for packets acknowledging received or unreceived segments 110' (step 609).

In the case where it is judged "not coincident" in the step 608 of FIG. 6, the entry is updated so that the SEQ range of the received packets is deleted from the SEQ of the unreceived segments, and the received packets are written into the received packet accumulation unit 121'. Further, a packet for acknowledging as unreceived segments a SEQ range of the unreceived segments before the SEQ range of the received packets and as received segments a SEQ range of the received packets, is output to the buffer 110' (step 610).

The RX packet retransmission unit 117' reads out packets continuously following the received packets from the received packet accumulation unit 121', based on the received packets and the entry received from the reception history update unit 118', and outputs the received packets and the read out packets to the received packet output control unit 122'.

FIG. 7 shows one example of a transmission/reception sequence of a data packet and a packet acknowledging received or unreceived segments, at a transmission side apparatus and a receiving side apparatus.

A solid line represents data packets, while a broken line represents an acknowledging packet. Value described at the vicinity of the starting point of the solid line represents a SEQ range of the data packets, while values described at the vicinity of the starting point of the broken line represents the SEQ range of already received/unreceived segments. At the further left side of the values described at the vicinity of the starting point of the solid line, transition of transmission bandwidth of the transmission side is shown.

According to the above is attained an apparatus for performing bandwidth control based on a retransmission bandwidth. In this way, a transmission bandwidth becomes not significantly influenced by RTT and discard rate, and thus a transmission bandwidth is improved under the environment such as WAN causing large RTT, large hop number and many discarded segments.

Embodiment 2

Figure 8:
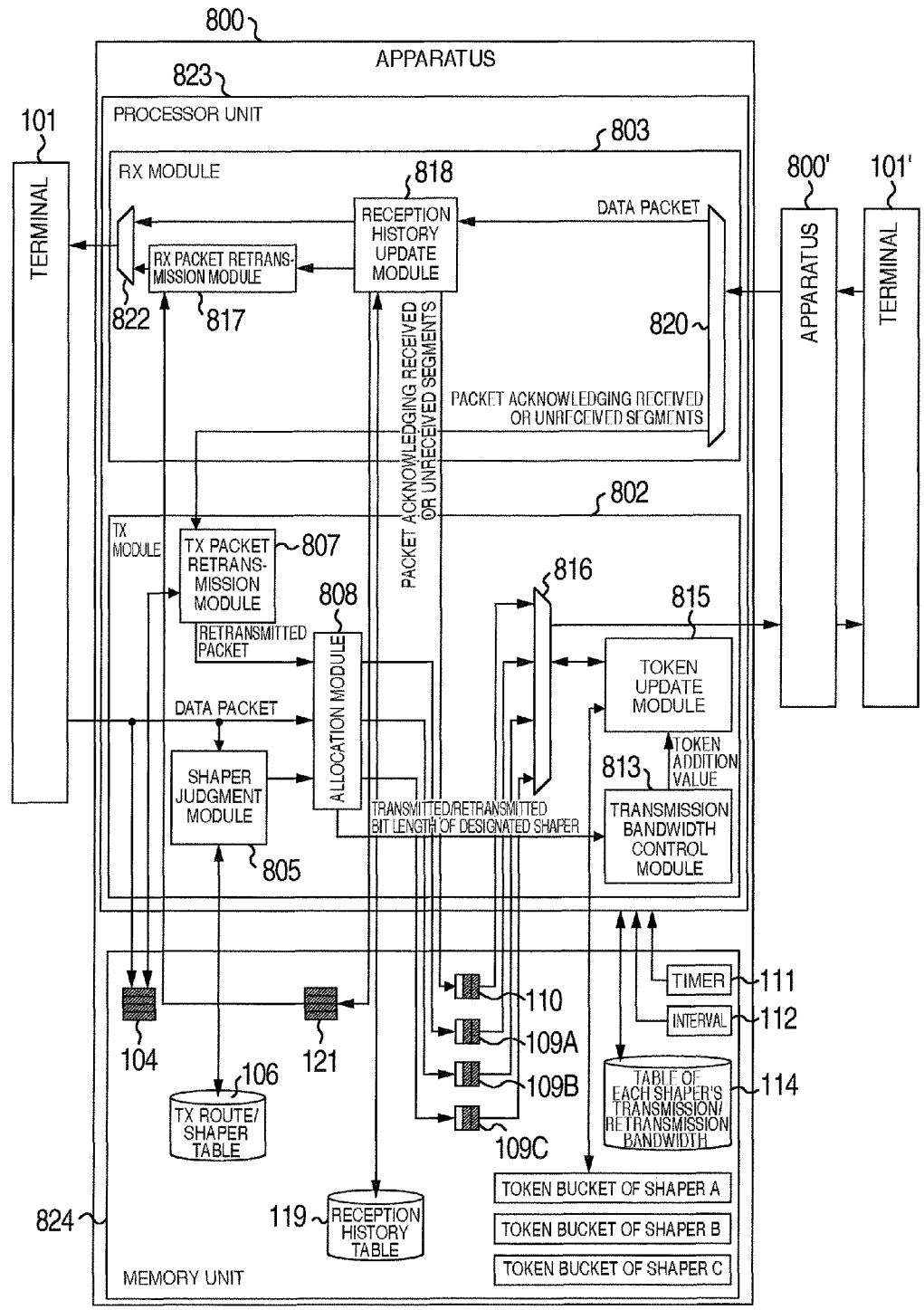
FIG. 8 is a block diagram of an apparatus 800 attaining, with software, an apparatus for performing bandwidth control, based on retransmission bandwidth.

With reference to FIG. 8 is explained an embodiment of an apparatus 800 for attaining, with software, an apparatus for performing bandwidth control based on a retransmission bandwidth.

FIG. 8 shows a block diagram of the apparatus 800. The apparatus 800 comprises a processor unit 823 and a memory unit 824.

The TX unit 102, the RX unit 103, the shaper judgment unit 105, the TX packet retransmission unit 107, the allocation unit 108, the transmission bandwidth control unit 113, the token control unit 115, the transmitted packet output control unit 116, the RX packet retransmission unit 117, the reception history update unit 118, the RX side allocation unit 120, and the received packet output control unit 122, in FIG. 1 are modularized to operate in the processor unit 823 as a TX module 802, a RX module 803, a shaper judgment module 805, a TX packet retransmission module 807, an allocation module 808, a transmission bandwidth control module 813, a token control module 815, a transmission packet output control module 816, an RX packet retransmission module 817, a reception history update module 818, an RX side allocation module 820, and a received packet output control module 822.

In addition, all of the transmission packet accumulation memory 104, the TX route/shaper table 106, the shaper 109, the buffer for packets acknowledging received or unreceived segments 110, the timer value storing unit 111, the interval time storing unit 112, the table of each shaper's transmission/retransmission bandwidth 114, the reception history table 119, and the received packet accumulation unit 121 in FIG. 1 are located in the memory unit 824.

According to the above is attained an apparatus for performing bandwidth control, based on a retransmission bandwidth by an apparatus surface mounted with software. In this way, a transmission bandwidth becomes not significantly influenced by RTT and discard rate, and thus a transmission bandwidth is improved under the environment such as WAN causing large RTT, large hop number and many discarded segments. It should be noted that each module is configured by reading out a program stored in a non-volatile memory medium of an apparatus 900.

Embodiment 3

Figure 9:
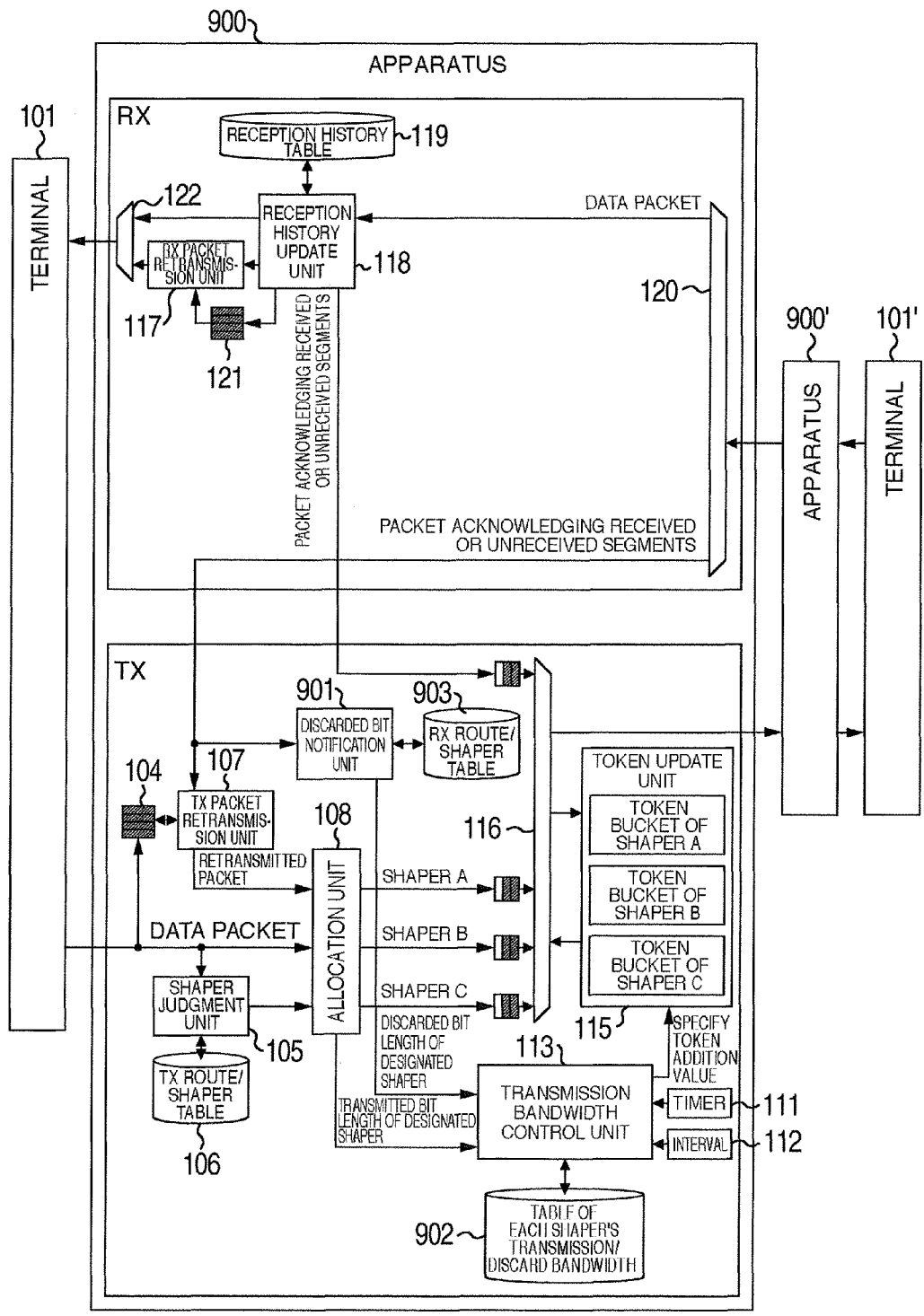
FIG. 9 is a block diagram of an apparatus 900 performing bandwidth control, based on discard bandwidth.

With reference to FIG. 9, FIG. 10 and FIG. 11 is explained an Embodiment of the apparatus 900 for performing bandwidth control based on a discard bandwidth.

FIG. 9 shows a block diagram of the apparatus 900. The apparatus 900 is configured by using the apparatus 100 described in Embodiment 1 as the base, replacing the table of each shaper's transmission/retransmission bandwidth 114 with a table of each shaper's transmission/discard bandwidth 902, and newly adding a discarded bit notification unit 901 and an RX route/shaper table 903.

FIG. 10 shows a format of an RX route/shaper table 903. It includes a plurality of entries for storing a RX route (a source IP/subnet, a destination IP/subnet, a source port, and a destination port) and a shaper. With respect to values of the RX route compared with the route/shaper table 106, the source IP/subnet and the destination IP/subnet are exchanged, and the source port and the destination port are exchanged.

FIG. 11 shows a format of a table of each shaper's transmission/discard bandwidth 902. It comprises a plurality of entries for storing base time, a control bandwidth (before base time), a control bandwidth (after base time), statistical data before base time (transmission bandwidth, and discard bandwidth), and statistical data after base time (transmitted bit integration value, and discard bid integration value), with respect to each shaper.

The discarded notification unit 901 determines total bit length of described unreceived segments, when it receives the packet acknowledging unreceived segments, to set it as discard length. Further, it reads out an entry with which a value described at the packet header and the RX route coincide, from an RX route/shaper table 903, and notifies a shaper described in the entry and the determined discarded length to the transmission bandwidth control unit 113.

The transmission bandwidth control unit 113 updates a table of each shaper's transmission/discard bandwidth 902, by a similar procedure as an updating method of a table of each shaper's transmission/retransmission bandwidth 114 described in FIG. 4. Further, it notifies the addition token calculated based on the above already updated control bandwidth (after base time), to the token control unit 115.

According to the above aspect is attained an apparatus for performing bandwidth control based on a discard bandwidth. In this way, a transmission bandwidth becomes not significantly influenced by RTT and discard rate, and thus such effect is obtained that a transmission bandwidth is improved under the environment such as WAN causing large RTT, large hop number and many discarded segments.

Embodiment 4

With reference to FIG. 12, FIG. 13, FIG. 14 and FIG. 15 is explained an embodiment of the apparatus 1200 for performing bandwidth control based on retransmitting connection number, by measuring retransmitting connection number.

Figure 12:
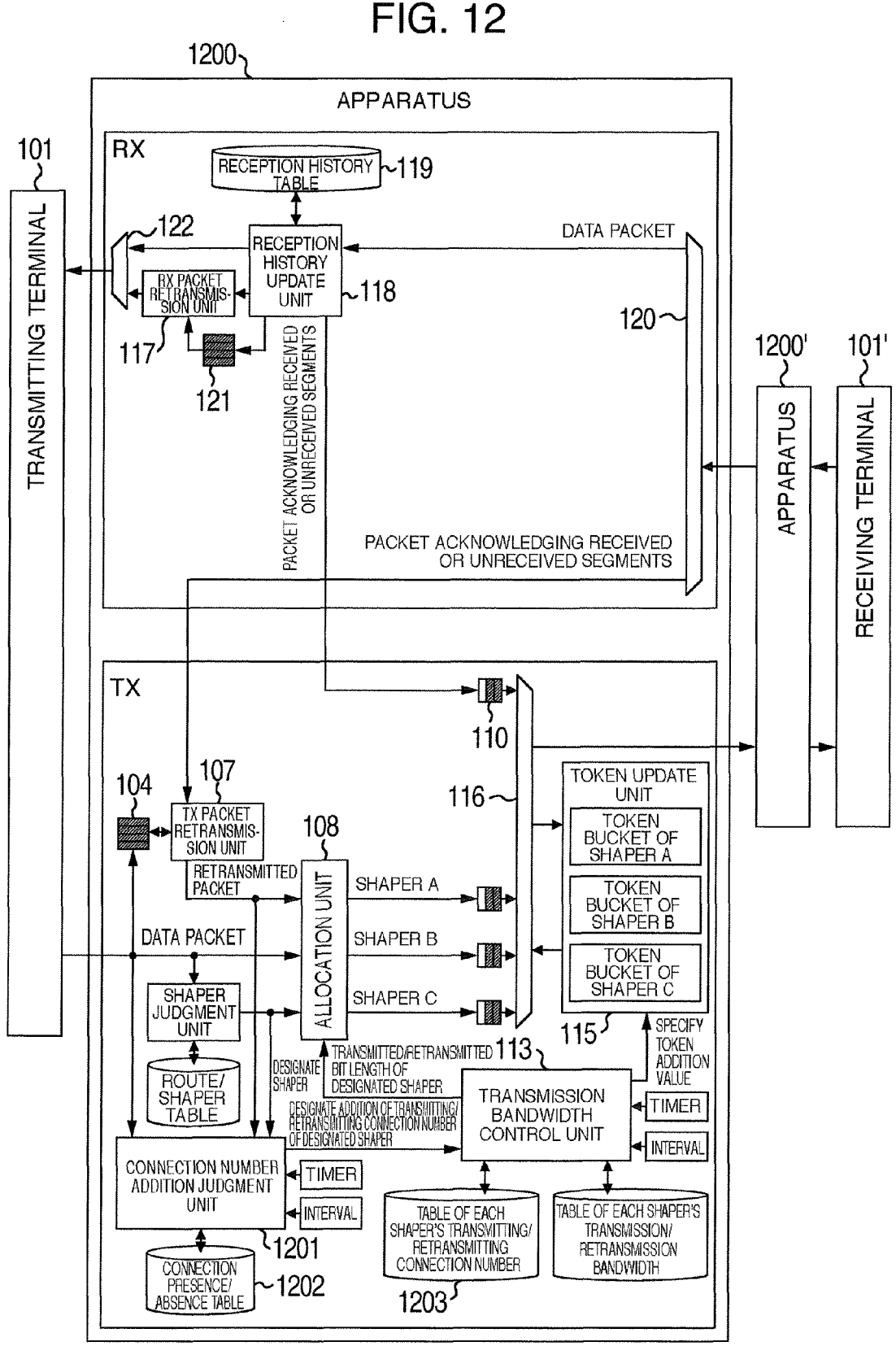
FIG. 12 is a block diagram of an apparatus 1200 measuring retransmitting connection number to performing bandwidth control based on retransmitting connection number.

FIG. 12 shows a block diagram of the apparatus 1200. The apparatus 1200 is configured by using the apparatus 100 described in Embodiment 1 as the base and adding a connection number addition judgment unit 1201, a connection presence/absence table 1202 and a table of each shaper's transmitting/retransmitting connection number 1203.

FIG. 13 shows a format of the connection presence/absence table 1202. It includes a plurality of entries for storing a source IP, a destination IP, a source port, a destination port, in retransmission (Yes=1, No=0) and the base time.

Figure 14:
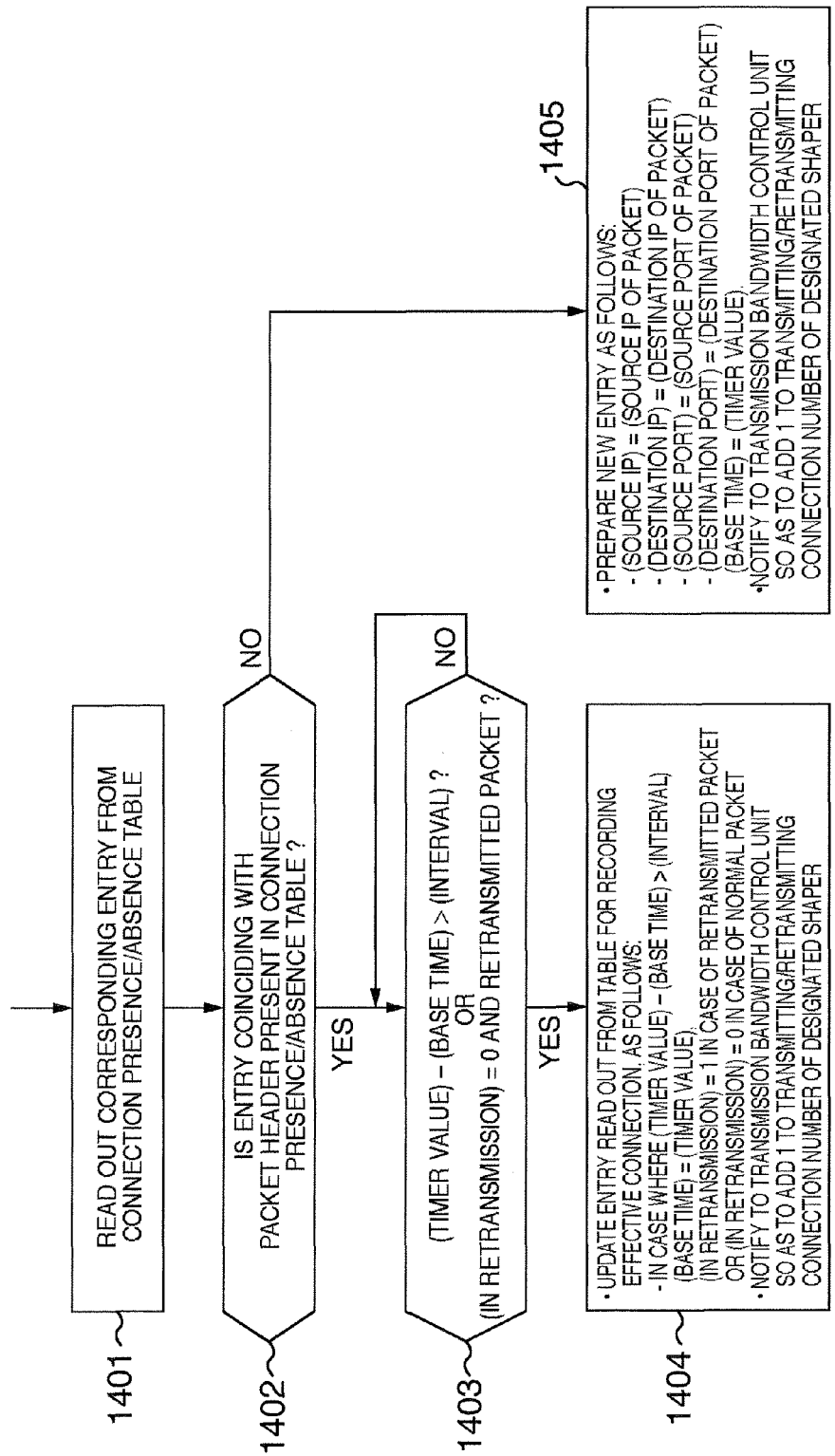
FIG. 14 is a flow chart of a process performed by a connection number addition judgment unit 1201 using values described in a connection presence/absence table 1202.

FIG. 14 shows a flow chart of the process performed by a connection number addition judgment unit 1201, using values described in the connection presence/absence table 1202.

The connection number addition judgment unit 1201 reads out an entry coinciding with a value described at the packet header, from the connection presence/absence table 1202 (step 1401), and judges whether or not the entry coinciding with the value described at the packet header is present (step 1402). In the case of absence, a new entry is prepared as (source IP)=(source IP of packet), (destination IP)=(destination IP of packet), (source port)=(source port of packet), (destination port)=(destination port of packet), and (base time)=(timer value). Further, it is notified to the notification bandwidth control unit 113 that "1" should be added to connection number of a designated shaper of a shaper judgment unit (step 1405). In the case where the coincident entry is present in the step 1402, it judges whether difference between the timer value 111 and the base time is larger than the interval time 112, or (retransmission described in entry)=0 and the input packet is a retransmitted packet, and in the case where both are not satisfied, it loops (step 1403). In the case where any one of them is satisfied, it updates the entry: to (base time)=(timer value), if the difference between the timer value 111 and the base time is larger than the interval time 112; to (retransmission)=1, if the input packet is a retransmitted packet; and to (retransmission)=0, if the input packet is a normal packet. Further it notifies to the transmission bandwidth control unit 113 that "1" should be added to the transmitting connection number of a designated shaper of the shaper judgment unit, if the input packet is a normal packet, and "1" should be added to the retransmitting connection number of a designated shaper of the shaper judgment unit, if the input packet is a retransmitted packet (step 1404).

FIG. 15 shows a format of table of each shaper's transmitting/retransmitting connection number 1203. It includes an entry for storing base time, statistical data before base time (transmitting connection number, and retransmitting connection number), and statistical data after base time (transmitting connection number integration value, and retransmitting connection number integration value), with respect to each shaper.

The transmission bandwidth control unit 113 updates the table of each shaper's transmitting/retransmitting connection number 1203, by a similar procedure as the table 114 of the each shaper's transmission/retransmission bandwidth described in FIG. 4.

The transmission bandwidth control unit 113 judges bandwidth reduction amount in discard detection, by looking at the table of each shaper's transmitting/retransmitting connection number 1203.

In this way, it is understood what percent of connections has been discarded when detecting the discard, and thus this embodiment has an effect of optimizing a reduction amount of a bandwidth.

Embodiment 5

An embodiment of the apparatus 1600 for performing bandwidth control, based on total packet receiving connection number acknowledged from a communication partner, is explained with reference to FIG. 16, FIG. 17, FIG. 18, FIG. 19, FIG. 20 and FIG. 21.

Figure 16A:
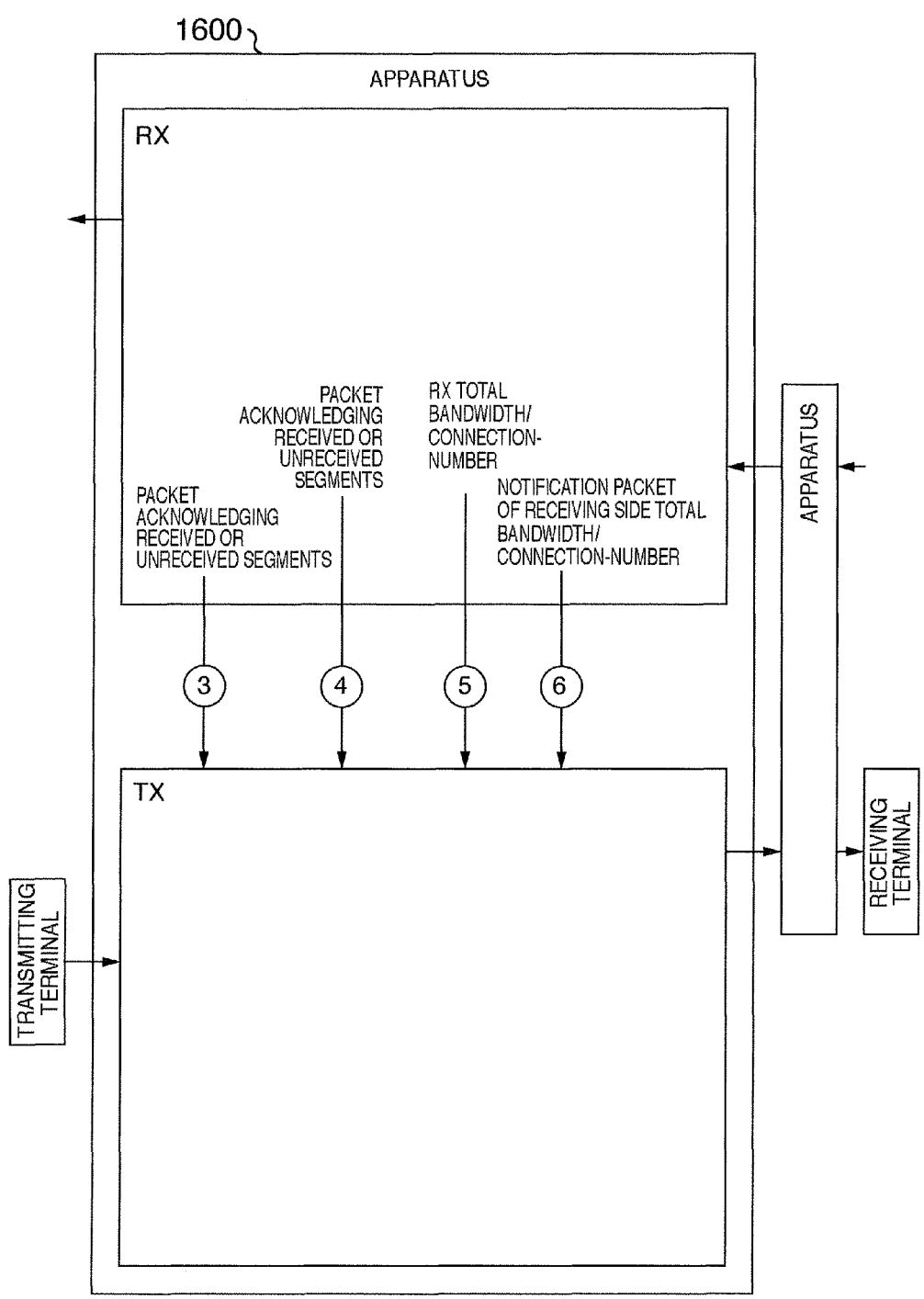
FIG. 16A is a block diagram of an apparatus 1600 performing bandwidth control based on total packet receiving connection number notified from a communication partner.
Figure 16B:
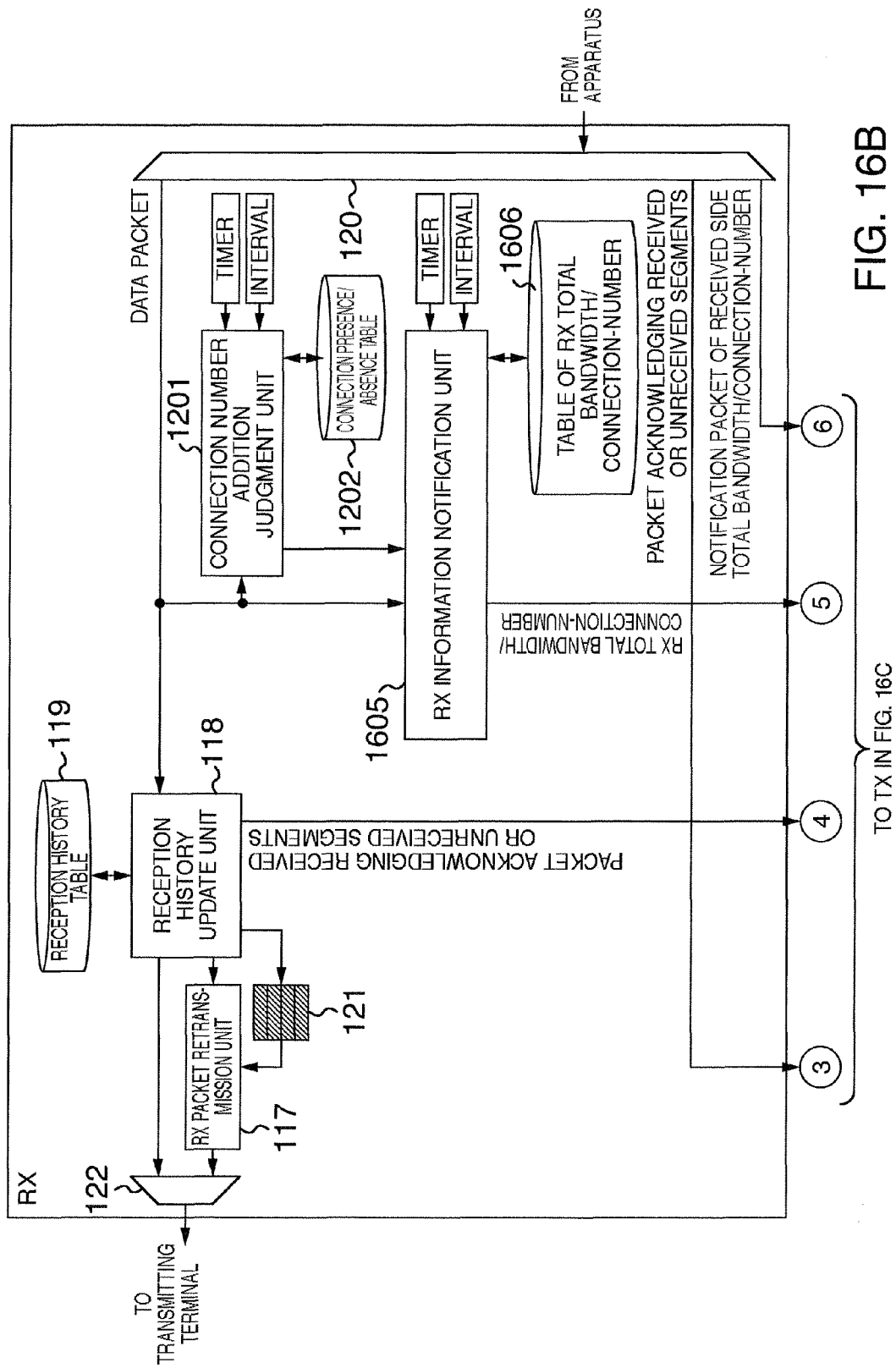
FIG. 16B is a block diagram of an apparatus 1600 performing bandwidth control based on total packet receiving connection number notified from a communication partner.

FIG. 16 shows a block diagram of the apparatus 1600. The apparatus 1600 is configured by using the apparatus 1200 described in Embodiment 4 as the base, adding the TX unit 102 to an RX route/shaper table 903; newly adding a table of each shaper's receiving side total bandwidth/connection-number 1601, for recording a receiving bandwidth of a communication partner or data receiving connection number, a receiving side total bandwidth/connection-number notification unit 1602, a feedback notification packet generation unit 1603, and a feedback notification address table 1604 to the TX unit 102; by adding the connection number addition judgment unit 1201 and connection presence/absence table 1202 to the RX unit 103; and by newly adding an RX information notification unit 1605 and an RX total bandwidth/connection-number table 1606, for recording a receiving bandwidth and packet receiving connection number, to the RX unit 103.

FIG. 17 shows a format of a table of each shaper's receiving side total bandwidth/connection-number 1601.

A table of each shaper's receiving side total bandwidth/connection-number 1601 includes a plurality of entries for storing total receiving bandwidth measured at a communication partner side by each shaper, and total packet receiving connection number.

FIG. 18 shows a format of a feedback notification address table 1604.

A feedback notification address table 1604 is composed a plurality of entries for storing a destination IP address in the case where the feedback notification subject is a terminal, and also a subnet along with a destination IP address in the case where the feedback notification subject is a base.

FIG. 19 shows a format of an RX total bandwidth/connection-number table 1606.

An RX total bandwidth/connection-number table 1606 stores base time, statistical data before base time (RX total bandwidth, and RX total connection number), and statistical data after base time (RX total bit integration value, and RX total connection number integration value).

The RX information notification unit 1605 adds statistical data after base time (RX total bit integration value, and RX total connection number integration value) of an RX total bandwidth/connection-number table 1606, using addition notification of connection number from the connection number addition judgment unit 1201, and packet length described in the header of the data packet input from the RX side allocation unit 120. When addition notification of connection number is received, "1" is added to integration value of RX total connection and the packet length is converted to bit length to be added to integration value of RX total bit.

Further, the RX information notification unit 1605 updates an RX total bandwidth/connection-number table 1606, using the flow chart shown in FIG. 20.

The RX information notification unit 1605 repeatedly performs judgment on whether or not difference between the timer value 111 and the base time becomes larger than the interval time 112, until it is satisfied (step 2001). When it is satisfied, it updates the table, as (total RX bandwidth before base time)={RX total bit integration value after base time}/{(timer value)−(base time)}, (total RX connection number before base time)=(RX total connection number integration value after base time), {(base time)−(timer value)}, (total RX bit integration value bandwidth after base time)=0, and (total RX connection number integration value after base time)=0 (step 2002).

The total RX bandwidth/total connection number before the updated base time is output to the feedback notification packet generation unit 1603.

The feedback notification packet generation unit 1603 generates a notification packet including the notified RX total bandwidth/connection-number, and outputs them to the all addresses described in a feedback notification address table 1604.

On the contrary, when the apparatus 1600 receives the notification packet including the total RX bandwidth/total connection number from a communication partner, it outputs them to the receiving side total bandwidth/connection-number notification unit 1602 via the RX side allocation unit 120.

The receiving side total bandwidth/connection-number notification unit 1602 reads out an entry coincident with a value described in the packet header from an RX route/shaper table 903, and notifies the receiving side total bandwidth/total connection number described in the notification packet, to the transmission bandwidth control unit 113, by associating it with a shaper described in the entry.

The transmission bandwidth control unit 113 describes the receiving side total bandwidth/total connection number of the notified shaper, to a table of each shaper's receiving side total bandwidth/connection-number 1601.

The transmission bandwidth control unit 113 controls the bandwidth, for example, as shown in FIG. 21, by using the receiving side total bandwidth/total connection number described in a table of each shaper's receiving side total bandwidth/connection-number 1601, and the transmitting connection number described in a table of each shaper's transmitting/retransmitting connection number 1203.

In FIG. 21, it is presumed that number of communication connection transmitting data from the transmitting terminal 2101 toward the receiving terminal 2103 was "2", and number of communication connection transmitting data from the transmitting terminal 2102 toward the receiving terminal 2103 was "1". When it is assumed that the total RX bandwidth was "12" and number of the total RX connections was "3", which were measured in the apparatus 1600C connected to the receiving terminal 2103, information that the total RX bandwidth was "12" and the number of the total RX connections was "3" is fed back to be notified from the apparatus 1600C toward the apparatus 1600A/B connected to the transmitting terminal 2101/2102. The apparatus 1600A determines the bandwidth per connection as "4" from information that the total RX bandwidth fed back to be notified was "12" and number of the total RX connections was "3", and adjusts the transmission bandwidth to 4×2=8, based on the transmitting connection number: 2 described in a table of each shaper's transmitting/retransmitting connection number 1203A of the apparatus 1600A. The apparatus 1600B determines the bandwidth per connection as "4" from information that the total RX bandwidth fed back to be notified was "12" and number of the total RX connections was "3", and adjusts the transmission bandwidth to 4×1=4, based on the transmitting connection number: 1 described in the table of each shaper's transmitting/retransmitting connection number 1203A of the apparatus 1600B.

According the above described apparatus for controlling the bandwidth based on total packet receiving connection number notified from a communication partner, fair bandwidth assignment can be attained among terminals, and thus constant communication quality can be attained not depending on a terminal.

Embodiment 6

Figure 22:
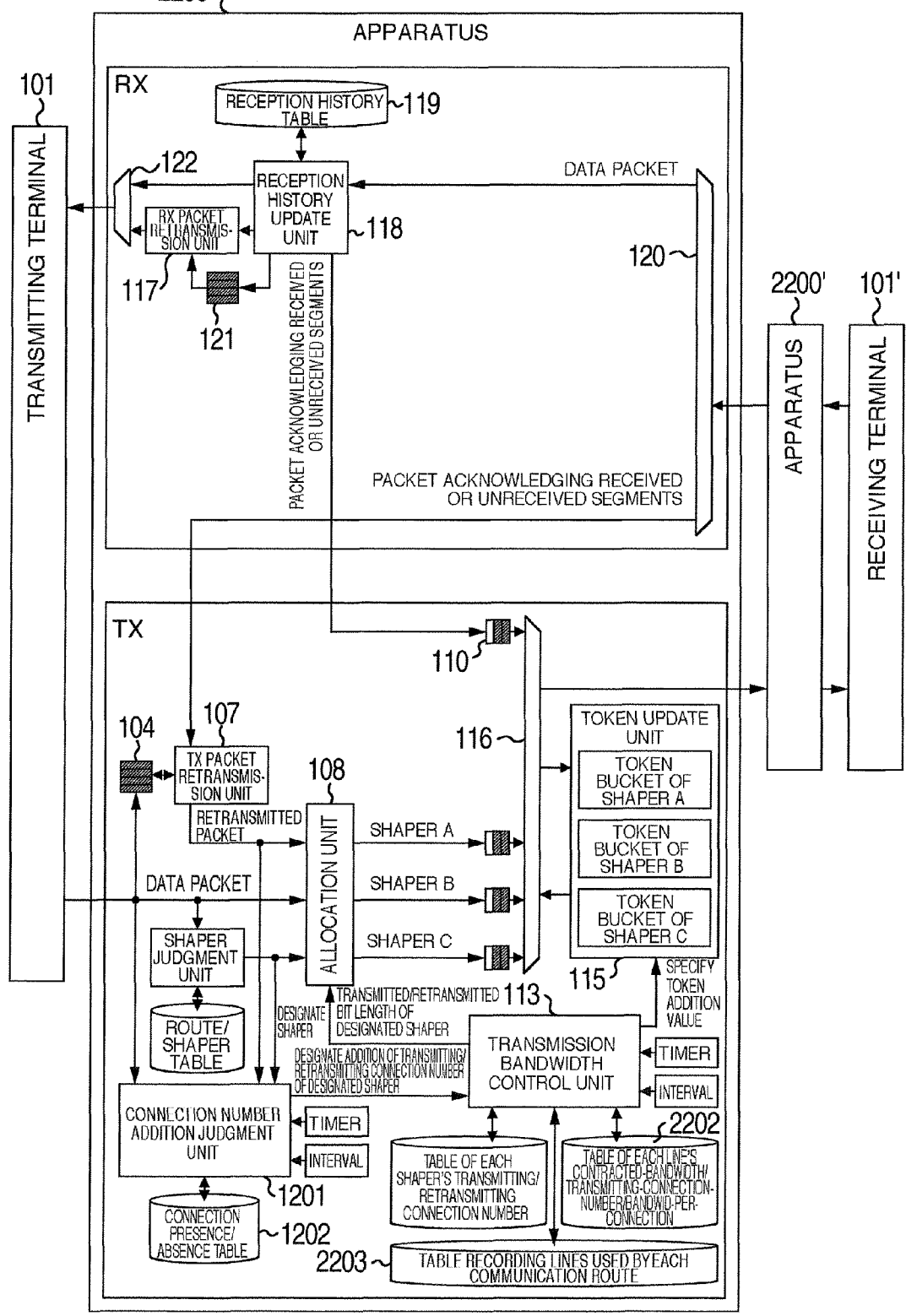
FIG. 22 is a block diagram of an apparatus 2200 performing bandwidth control based on contracted bandwidth, packet transmitting connection number, and contracted bandwidth per connection of a line used by a communication route from a transmitting terminal to a receiving terminal.
Figure 23:
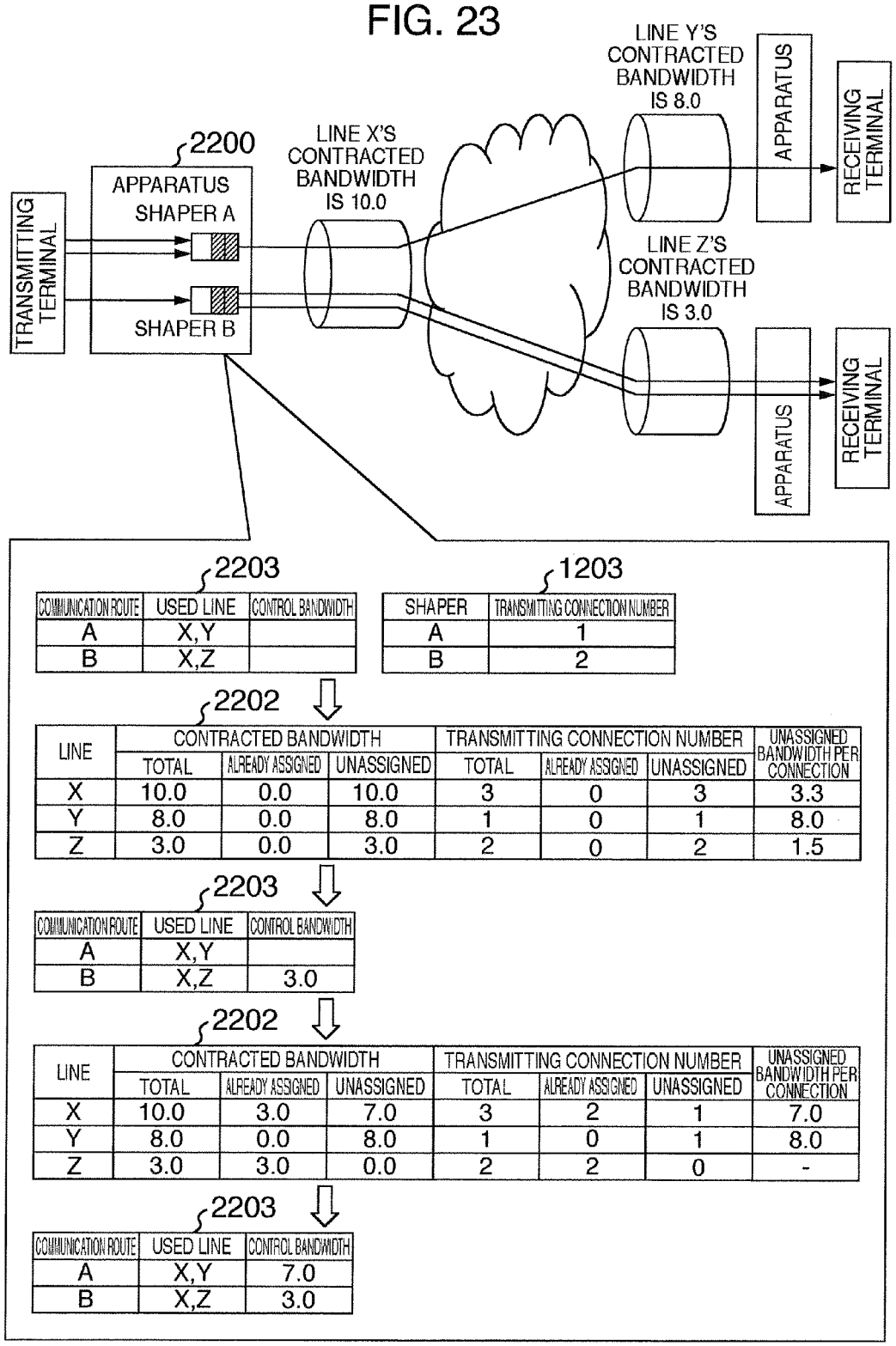
FIG. 23 is an explanatory diagram of bandwidth control.

With reference to FIG. 22 and FIG. 23 is explained an Embodiment of the apparatus 2200 for performing bandwidth control based on contracted bandwidth of a line used by a communication route from a transmitting terminal to a receiving terminal, packet transmitting connection number, and contracted bandwidth per connection.

FIG. 22 shows a block diagram of the apparatus 2200. The apparatus 2200 is configured by using the apparatus 1200 described in Embodiment 4 as the base, newly adding a table of each line's contracted-bandwidth/transmitting-connection-number/bandwidth-per-connection 2202, and a table recording lines used by each communication route 2203 of a shaper output packet.

FIG. 23 shows a format of a table of each line's contracted-bandwidth/transmitting-connection-number/bandwidth-per-connection 2202, and a table recording lines used by each communication route of a shaper output packet 2203. Further, in the case where there are a line X with contracted bandwidth of 10.0, a line Y with contracted bandwidth of 8.0, and a line Z with contracted bandwidth of 3.0; there are the line X and the line Y in a communication route of an output packet of the shaper A of the apparatus 2200; and there are the line X and the line Z in a communication route of an output packet of the shaper B, an example of a bandwidth control method of the transmission bandwidth control unit 113 of the apparatus 2200 is shown.

A table of each line's contracted-bandwidth/transmitting-connection-number/bandwidth-per-connection 2202 is provided with a plurality of entries for storing contracted bandwidth (overall bandwidth, already assigned bandwidth, and unassigned bandwidth) with respect to each line, transmitting connection number (overall number, already assigned number, and unassigned number), and number of unassigned bandwidth per connection.

A table recording lines used by each communication route of a shaper output packet 2203 is provided with a plurality of entries for storing the used lines and control bandwidth with respect to each communication route. In the present embodiment, it is assumed that the communication route of the shaper output packet is always only one route.

The transmission bandwidth control unit 113 calculates data transmitting connection number with respect to each line, using used lines and transmitting connection number described in a table recording lines used by each communication route of a shaper output packet 2203, and a table of each shaper's transmitting/retransmitting connection number 1203, to initialize transmitting connection number (total number, number already assigned, and number not assigned) of a table of each line's contracted-bandwidth/transmitting-connection-number/bandwidth-per-connection 2202, and calculate not assigned bandwidth per connection.

The transmission bandwidth control unit 113 calculates the control bandwidth of the shaper B to be 1.5×2=0.3, using the facts that the not assigned bandwidth per connection of the line Z is 1.5, which is minimum and that the line Z is included in the communication route B of an output packet of the shaper bandwidth a transmitting connection number of the shaper B is 2, and updates the control bandwidth of the communication route B of a table recording lines used by each communication route 2203 to 3.0.

Further, since the line X/Z are lines used by the communication route B of the output packet of the shaper B, the transmission bandwidth control unit 113 describes that transmitting connection number of the communication route B is 2, and the control bandwidth are 3.0, as contracted bandwidth already assigned/connection transmitting number already assigned of the lines X/Z of a table of each line's contracted-bandwidth/transmitting-connection-number/bandwidth-per-connection 2202, to recalculate not assigned bandwidth per connection.

The transmission bandwidth control unit 113 calculates a control bandwidth of the shaper A to be 7.0×1=7.0, using the facts that the not assigned bandwidth per connection of the line X after recalculation is 7.0, which is minimum, the line X is included in the communication route A of an output packet of the shaper A, and that a transmitting connection number of the shaper A is 1, and updates a control bandwidth of the communication route A of a table recording lines used by each communication route 2203 to 7.0.

Bandwidth control is performed using a control bandwidth with respect to each communication route of a table recording lines used by each communication route 2203 obtained by the above method.

By performing the above bandwidth control, such bandwidth control becomes possible that the contracted bandwidth is maximally utilized, depending on the communication environment of a user.

Embodiment 7

Figure 24:
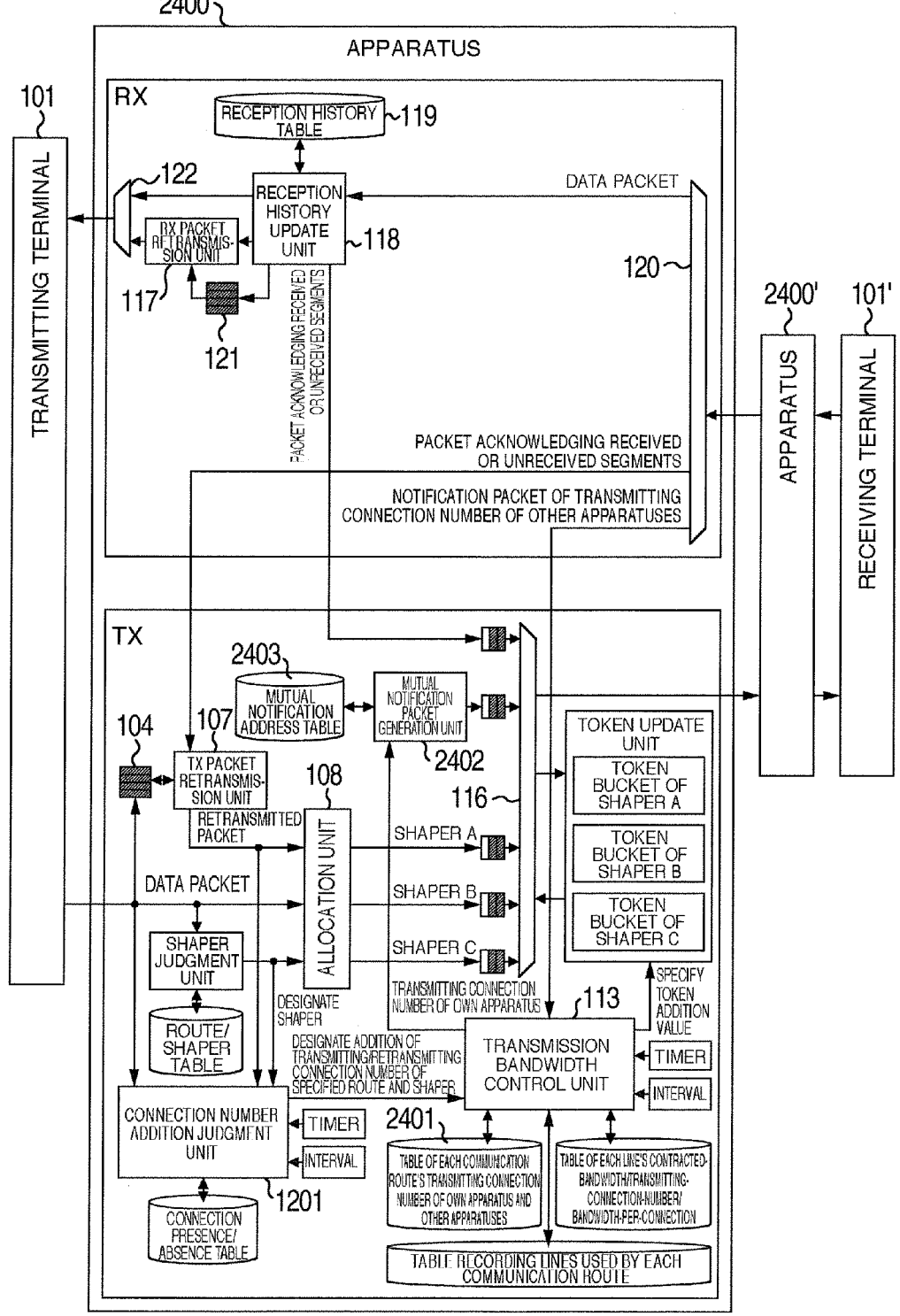
FIG. 24 is a block diagram of an apparatus 2400 performing bandwidth control based on contracted bandwidth, packet transmitting connection number of one's own apparatus and contracted bandwidth per connection of a line used by a communication route from a transmitting terminal to a receiving terminal as well as based on packet transmitting connection number of other apparatuses notified from other apparatuses.
Figure 26:
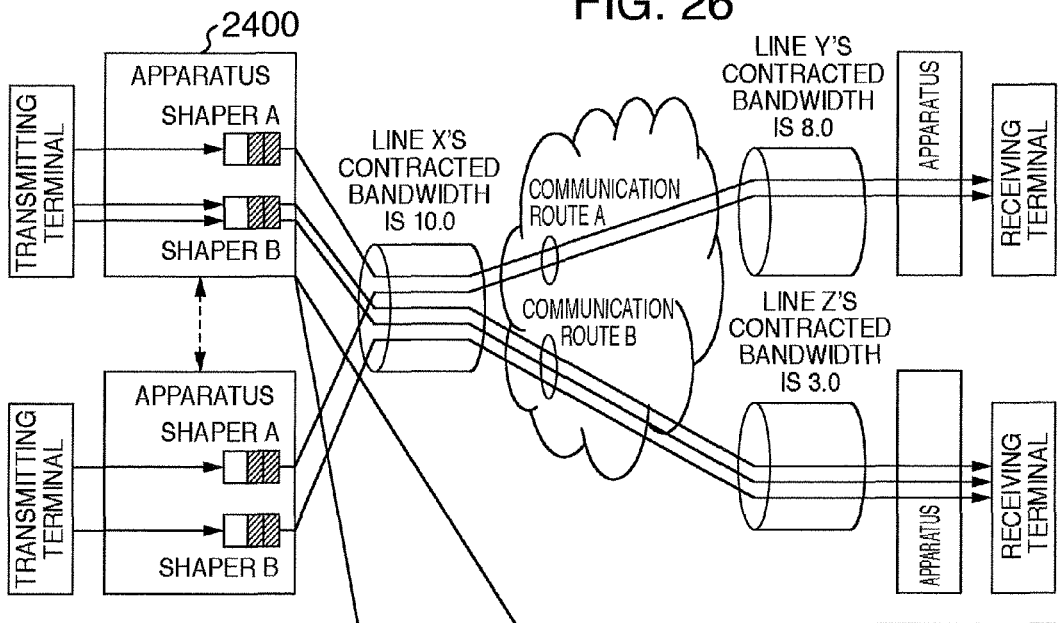
FIG. 26 is an explanatory diagram of bandwidth control.

With reference to FIG. 24, FIG. 25 and FIG. 26 is explained an embodiment of the apparatus 2400 for performing bandwidth control based on contracted bandwidth, packet transmitting connection number of one's own apparatus, and contracted bandwidth per connection of a line used by a communication route from a transmitting terminal to a receiving terminal as well as packet transmitting connection number of other apparatuses notified from other apparatuses.

FIG. 24 shows a block diagram of the apparatus 2400. The apparatus 2400 is configured by using the apparatus 2200 of Embodiment 6 as the base, adding a mutual notification packet generation unit 2402 and a mutual notification address table 2403, and is provided with a table of each communication route's transmitting connection numbers of one's own apparatus and other apparatuses 2401 of a shaper output packet, instead of a table of each shaper's transmitting/retransmitting connection number 1203. In the present embodiment, it is assumed that the communication route of the shaper output packet is always only one route. A format of a mutual notification address table 2403 is the same as a feedback notification address table 1604.

FIG. 25 shows a format of a table of each communication route's transmitting connection numbers of one's own apparatus and other apparatuses 2401 of a shaper output packet.

A table of each communication route's transmitting connection numbers of one's own apparatus and other apparatuses 2401 is provided with a plurality of entries for storing base time, statistical data before base time (data transmitting connection number of one's own apparatus, data transmitting connection number of other apparatuses), and statistical data after base time (data transmitting connection number integration value of one's own apparatus, data transmitting connection number integration value of other apparatuses).

The transmission bandwidth control unit 113 receives addition notification of transmitting connection number from the connection number addition judgment unit 1201, and a notification packet of transmitting connection number of other apparatuses from the RX side allocation unit 120. Further, at the timing when difference between the timer value 111 and the base time becomes larger than the interval time 112, it updates each communication route's transmitting connection number of one's own apparatus and other apparatuses of the shaper output packet after base time, similarly to a table of each shaper's transmitting/retransmitting connection number 1203.

Further, the transmission bandwidth control unit 113 notifies a transmitting connection number of one's own apparatus to the mutual notification packet generation unit 2402. The mutual notification packet generation unit 2402 generates a packet for notifying the transmitting connection number of one's own apparatus to the all addresses described in a mutual notification address table 2403.

FIG. 26 shows an example of a control method of a bandwidth by the transmission bandwidth control unit 113 using a table of each line's contracted-bandwidth/transmitting-connection-number/bandwidth-per-connection 2202 and a table recording lines used by each communication route of a shaper output packet 2203, in the case where there are a line X with contracted bandwidth 10, a line Y with contracted bandwidth 8, and a line Z with contracted bandwidth 3; there are the line X and the line Y as lines used by a communication route of an output packet of the shaper A of the apparatus 2400; and there are the line X and the line Z as lines used by a communication route of an output packet of the shaper B.

The transmission bandwidth control unit 113 calculates each line's transmitting connection number, using each communication route's used lines, transmitting connection number of one's own apparatus, and transmitting connection number of other apparatuses, described in a table recording lines used by each communication route of a shaper output packet 2203 and a table of each communication route's transmitting connection numbers of one's own apparatus and other apparatuses 2401, to initialize connection numbers (overall number, already assigned number, and unassigned number) of a table of each line's contracted-bandwidth/transmitting-connection-number/bandwidth-per-connection 2202, and calculate a not assigned bandwidth per connection (step 2601).

The apparatus 2400 sets a control bandwidth of the shaper B, which outputs a packet toward the communication route B, to be 1.0×2=2.0, using the facts that the not assigned bandwidth per connection of the line Z is 1.0, which is minimum and that data transmitting connection number of one's own apparatus of the communication route B including the line Z is "2" (step 2602).

Further, because the lines X/Z are lines used by the communication route B, a control bandwidth of 3.0 for total 3 of data transmitting connection number of the communication route B, is described in the table 2401, as already assigned bandwidth and already assigned connection number of the lines X and Z in a table of each line's contracted-bandwidth/transmitting-connection-number/bandwidth-per-connection 2202, and not assigned bandwidth per connection is recalculated (step 2603).

The apparatus 2400 sets to be 3.5×1=3.5 the control bandwidth of the shaper A outputting a packet toward the communication route A, using the facts that the not assigned bandwidth per connection of the line X after recalculation is 3.5, which is minimum and that data transmitting connection number of one's own apparatus of the communication route A including the line X is 1 (step 2604).

As described above, by performing bandwidth control based on contracted bandwidth, packet transmitting connection number of one's own apparatus, and contracted bandwidth per connection of a line used by a communication from a transmitting terminal to a receiving terminal as well as packet transmitting connection number of other apparatuses notified from other apparatuses, the bandwidth control can more reflect the communication environment.

Embodiment 8

Figure 27B:
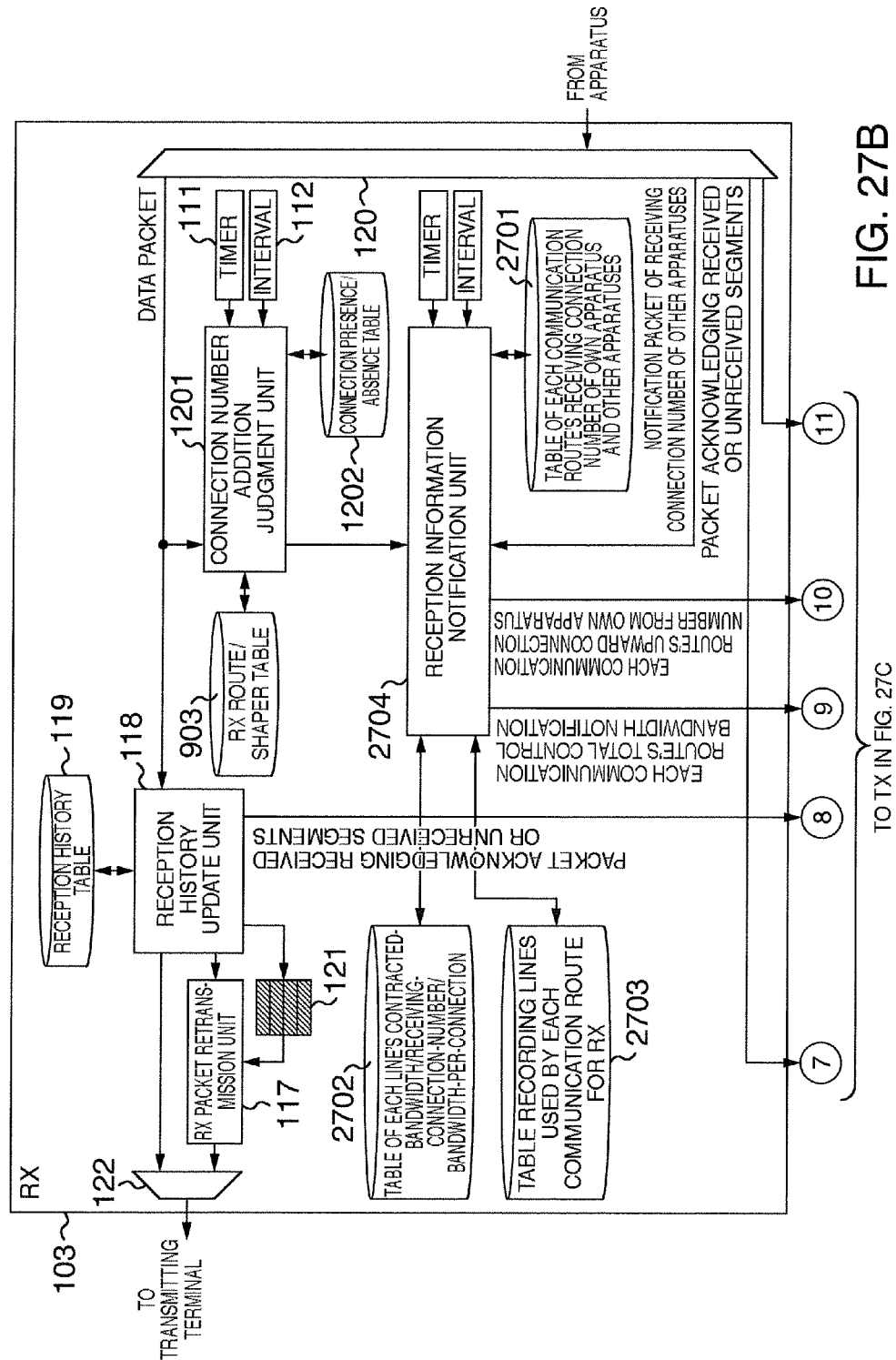
FIG. 27B is a block diagram of an apparatus 2700 performing bandwidth control based on contracted bandwidth, packet receiving connection number of one's own apparatus and contracted bandwidth per connection of a line used by a communication route from a receiving terminal to a transmitting terminal as well as packet receiving connection number of other apparatuses.
Figure 29:
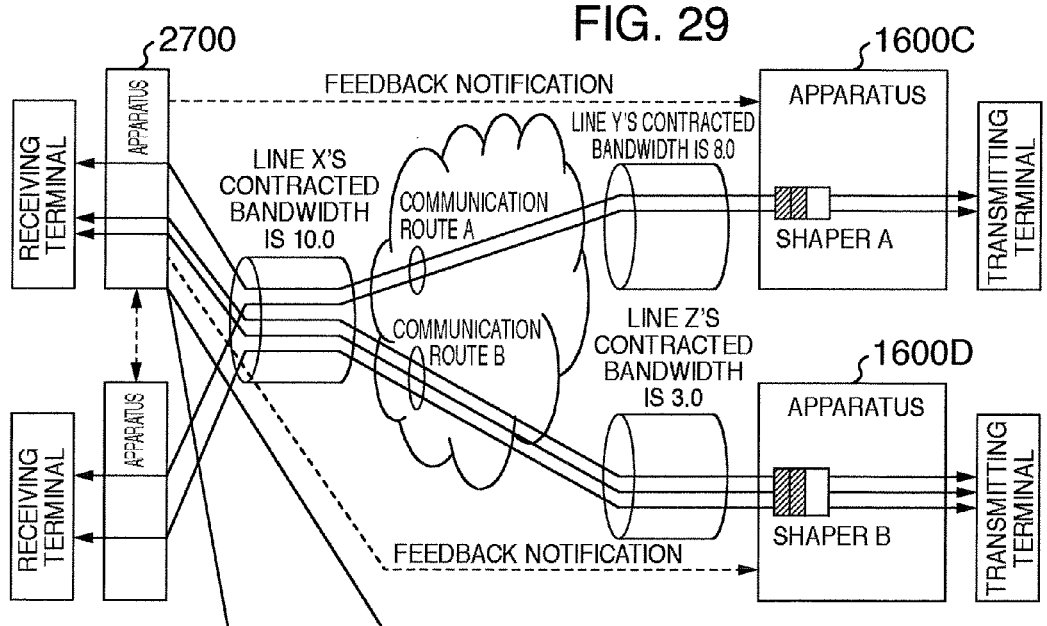
FIG. 29 is an explanatory diagram of bandwidth control.

With reference to FIG. 27, FIG. 28 and FIG. 29 is explained an embodiment of the apparatus 2700 for performing bandwidth control based on contracted bandwidth, packet receiving connection number of own apparatus, and contracted bandwidth per connection of a line used by a communication from a transmitting terminal to a receiving terminal as well as packet receiving connection number of other apparatuses notified from other apparatuses.

FIG. 27 shows a block diagram of the apparatus 2700. The apparatus 2700 is configured by using the apparatus 2400 described in Embodiment 7 as the base and adding the feedback notification packet generation unit 1603 and a feedback notification address table 1604 to the TX unit 102. In addition, by adding to the RX unit 103 the connection number addition judgment unit 1201, a connection presence/absence table 1202, an RX route/shaper table 903, the timer value storing unit 111, and the interval time storing unit 112, it becomes possible to designate addition of the data receiving connection number with respect to each communication route, similarly to the TX unit 102. Further, the RX unit 103 is also provided with a table of each communication route's receiving connection number of one's own apparatus and other apparatuses 2701, a table of each line's contracted-bandwidth/receiving-connection-number/bandwidth-per-connection 2702, and a table recording lines used by each communication route for RX 2703, similarly to the table of each communication route's transmitting connection number of one's own apparatus and other apparatuses 2401 of the shaper output packet of the TX unit 102, the table of each line's contracted-bandwidth/transmitting-connection-number/bandwidth-per-connection 2202, and the table recording lines used by each communication route of a shaper output packet 2203. Further, by updating values of these tables, a reception information notification unit 2704 for notifying the updated values to a notification packet generation unit is provided with. In the present embodiment, it is assumed that the communication route of the shaper output packet is always only one route.

FIG. 28 shows a format of a table of each communication route's receiving connection number of one's own apparatus and other apparatuses 2701.

A table of each communication route's receiving connection number of one's own apparatus and other apparatuses 2701 is provided with a plurality of entries for storing base time, statistical data before base time (data transmitting connection number of one's own apparatus, and data transmitting connection number of other apparatuses), and statistical data after base time (data transmitting connection number integration value of one's own apparatus, and data transmitting connection number integration value of other apparatuses).

The reception information notification unit 2704 adds statistical data after base time to a table of each communication route's receiving connection number of one's own apparatus and other apparatuses 2701, using addition designation of receiving connection number of one's own apparatus from the connection number addition judgment unit 1201, and receiving connection number of other apparatuses described in a notification packet received from the RX side allocation unit 120. At the timing when difference between the timer value 111 and the base time becomes over the interval time storing unit 112, it updates statistical data before base time, similarly as the table of each communication route's transmitting connection numbers of one's own apparatus and other apparatuses 2401 of the shaper output packet.

FIG. 29 shows an example of a feedback notification method of total-control-bandwidth/total-receiving-connection-number, by an apparatus 2700 to the apparatus 1600C and the apparatus 1600D connected to a communication partner, using a table of each communication route's receiving connection number of one's own apparatus and other apparatuses 2701, a table of each line's contracted-bandwidth/receiving-connection-number/bandwidth-per-connection 2702, and a table recording lines used by each communication route 2703, in the case where there are a line X with contracted bandwidth of "10", a line Y with contracted bandwidth of "8", and a line Z with contracted bandwidth of "3"; there are the line X and the line Y in the communication route A; and there are the line X and the line Z in the communication route B.

The reception information notification unit 2704 of an apparatus 2700 calculates data receiving connection number with respect to each line, using lines used by each communication route described in a table recording lines used by each communication route 2703, and receiving connection number of one's own apparatus described in a table of each communication route's receiving connection number of one's own apparatus and other apparatuses 2701, to initialize receiving connection number (total number, number already assigned, and number not assigned) of a table of each line's contracted-bandwidth/receiving-connection-number/bandwidth-per-connection 2702, and calculate not assigned bandwidth per connection (step 2901).

The apparatus 2700 sets total control bandwidth of the shaper B to be 1.0×3=3.0, using the facts that the not assigned bandwidth per connection of the line Z is 1.0, which is minimum and that total data receiving connection numbers of the communication route B including the line Z is 3.0 (step 2902).

Further, because the lines X/Z are lines used by the communication route B, it adds total data receiving connection number of the communication route "3" and total control bandwidth "3.0" as already assigned contacted bandwidth and already assigned receiving connection number of the lines X and Z, to a table of each line's contracted-bandwidth/receiving-connection-number/bandwidth-per-connection 2702, to recalculate not assigned bandwidth per connection (step 2903).

The apparatus 2700 sets to 3.5×2=7.0 total control bandwidth of the communication route A, using the facts that the not assigned bandwidth per connection of the line X after recalculation is 3.5, which is minimum and that total receiving connection numbers of the communication route A including the line X is 2 (step 2904).

The total control bandwidth and the total receiving connection number of respective resultant communication routes are notified to the feedback notification packet generation unit 1603 to prepare a notification packet toward the all addresses described in a feedback notification address table 1604. Further, it is fed back to be notified to the data transmission side apparatus 1600C/D, Embodiment 5 being applied to the data transmission side apparatus 1600C/D.

The transmission side apparatus 1600C/D controls the transmission bandwidth based on the total control bandwidth and total receiving connection number described in the feedback-notification packet received.

Provided that a terminal which the apparatus 2700 is connected to is a server terminal, and a terminal which the apparatus 1600C/D is connected to is a client terminal, an apparatus connected to the client terminal becomes not necessary to perform feedback notification or mutual notification. Thus it becomes possible to share information on connection number irrespective of a status of an apparatus connected to the client terminal.

As described above, by performing bandwidth control by adding information on transmitting connection number notified from other apparatuses as well as information on receiving connection number notified from other apparatuses, the bandwidth control can more reflect communication environment.

Embodiment 9

Figure 30:
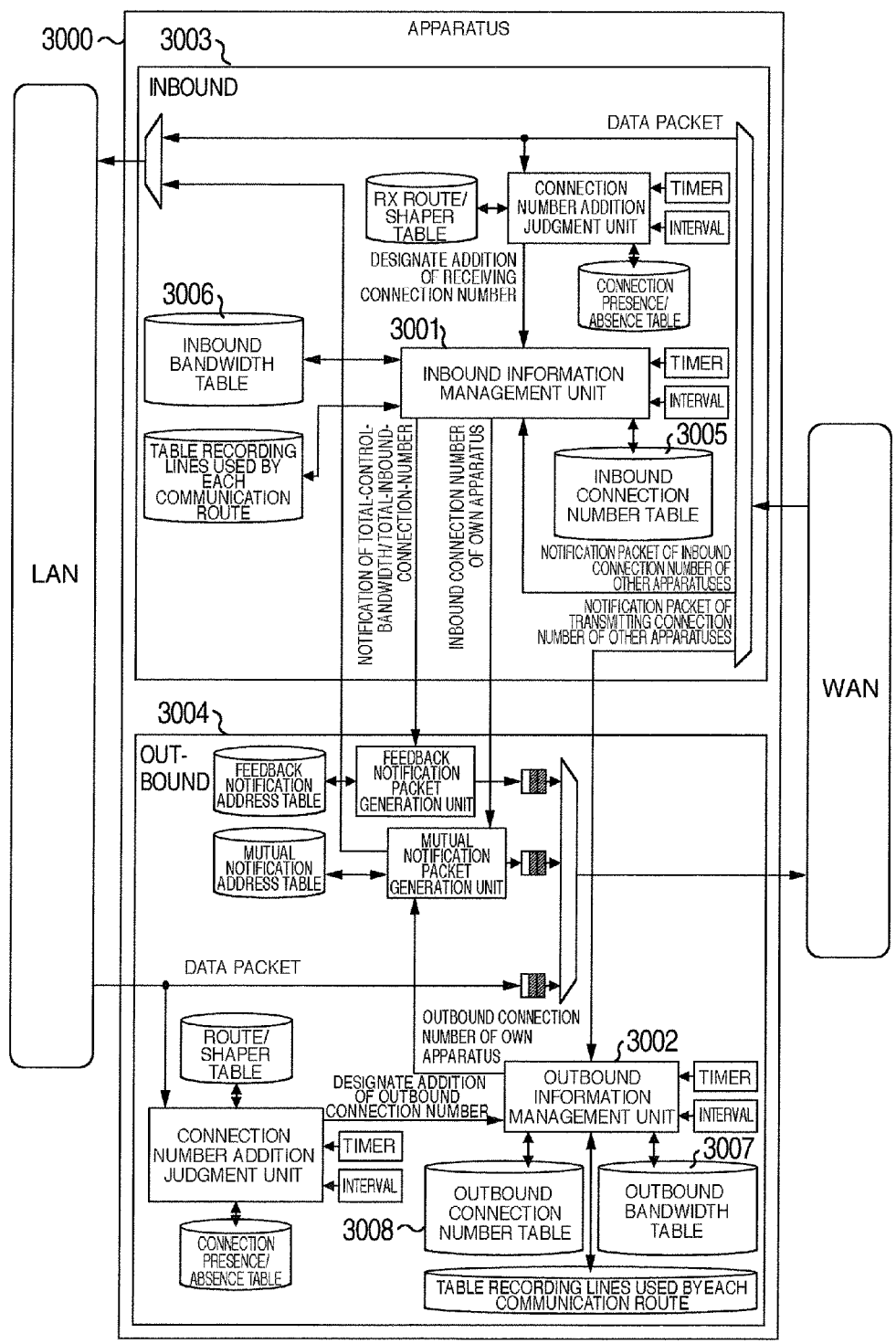
FIG. 30 is a block diagram of an apparatus 3000 installed at the connection of LAN and WAN, which measures collectively contracted-bandwidth/data-transmitting-connection-number/data-receiving-connection-number of a line used by a communication route, unilaterally notifies measurement result to other apparatuses connected to the same LAN, and mutually notifies among other apparatuses connected to other WAN.
Figure 31:
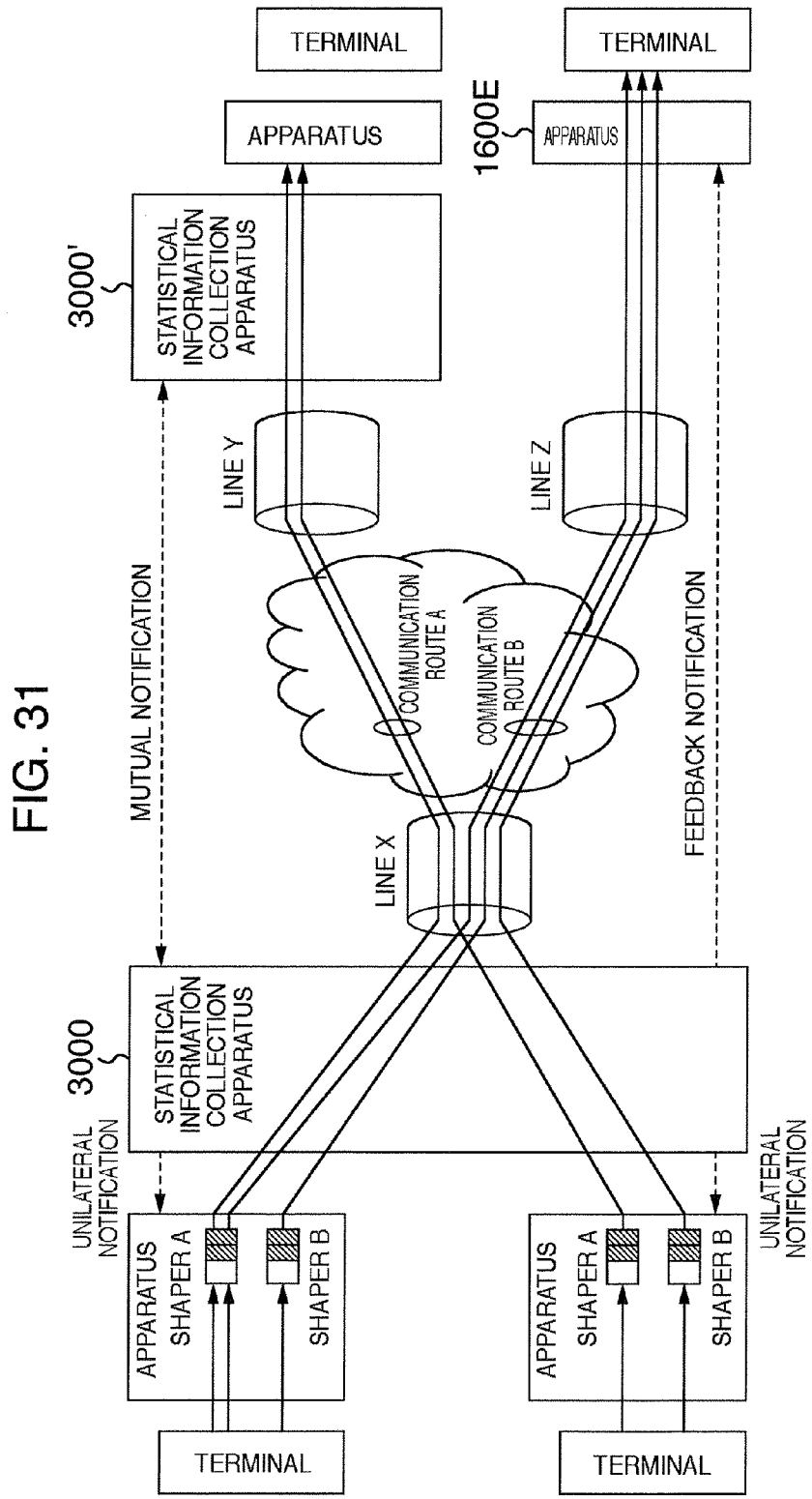
FIG. 31 is an explanatory diagram of bandwidth control.

With reference to FIG. 30 and FIG. 31 is explained an embodiment of the apparatus 3000 installed at connection of LAN and WAN measures collectively-contracted-bandwidth/data-transmitting-connection-number/data-receiving-connection-number of a line used by a communication route, unilaterally notifies measurement results to other apparatuses connected to the same LAN, and mutually notifies to other apparatuses connected to other WAN and vice versa.

FIG. 30 shows a block diagram of the apparatus 3000. The apparatus 3000 is configured by using the apparatus 2700 described in Embodiment 8 as the base, deleting blocks relating to retransmission function and bandwidth control function, and changing the TX unit to an outbound unit 3004, and the RX unit to an inbound unit 3003; and is provided with an inbound information management unit 3001 for measuring a connection number in a direction from WAN toward LAN, instead of the reception information notification unit 2704, an outbound information management unit 3002 for measuring a connection number in a direction from LAN toward WAN, instead of the transmission bandwidth control unit 113, a table of each communication route's outbound connection numbers of one's own apparatus and other apparatuses 3008, instead of the table of each communication route's transmitting connection numbers of one's own apparatus and other apparatuses 2401, a table of each communication route's inbound connection number of one's own apparatus and other apparatuses 3005, instead of the table of each communication route's receiving connection number of one's own apparatus and other apparatuses 2701, a table of each line's contracted-bandwidth/outbound-connection-number/bandwidth-per-connection 3007, instead of table of each line's contracted-bandwidth/transmitting-connection-number/bandwidth-per-connection 2202, and a table of each line's contracted-bandwidth/inbound-connection-number/bandwidth-per-connection 3006, instead of table of each line's contracted-bandwidth/receiving-connection-number/bandwidth-per-connection 2702.

The outbound information management unit 3002 updates a table of each line's contracted-bandwidth/outbound-connection-number/bandwidth-per-connection 3007, and a table of each communication route's outbound connection numbers of one's own apparatus and other apparatuses 3008, by a similar method as the transmission bandwidth control unit 113, and notifies outbound connection number of own apparatus to the mutual notification packet generation unit.

The inbound information management unit 3001 updates a table of each line's contracted-bandwidth/inbound-connection-number/bandwidth-per-connection 3006, and a table of each communication route's inbound connection number of one's own apparatus and other apparatuses 3005, by a similar method as the reception information notification unit 2704, and notifies inbound connection number of own apparatus to the mutual notification packet generation unit, as well as notifies total control bandwidth of one's own apparatus, and number of total inbound connections to the feedback notification packet generation unit.

The mutual notification packet generation unit 2402 outputs the notification packet to both a WAN side and a LAN side. The feedback notification packet generation unit 1603 outputs the notification packet only to the WAN side.

FIG. 31 represents a notifying direction of statistical information between apparatuses.

A statistical information collection apparatus 3000 unilaterally notifies inbound connection number of the communication route A and the communication route B to the apparatus 2400 X/Y, Embodiment 7 being applied to the apparatus 2400 X/Y The apparatus 2400 X/Y performs bandwidth control by subtracting transmitting connection number of one's own apparatus from connection number described in the notification packet from the apparatus 3000 to obtain transmitting connection number of other apparatuses.

In addition, the statistical information collection apparatus 3000 and another statistical information collection apparatus 3000' installed at a connection part of other LAN and WAN mutually notifies information on inbound connection number and outbound connection number of each communication route.

Further, the statistical information collection apparatus 3000 notifies inbound connection number and total inbound control bandwidth to an apparatus 1600E, Embodiment 5 being connecting to a terminal and applied to the apparatus 1600E connecting to a terminal.

By using the above statistical information collection apparatus, the bandwidth control based on information on transmitting and receiving connection numbers notified from an apparatus, is attained, in the case where many apparatuses are present within a base, the bandwidth control can more reflect the communication environment while reducing the notification number.

Embodiment 10

Figure 32:
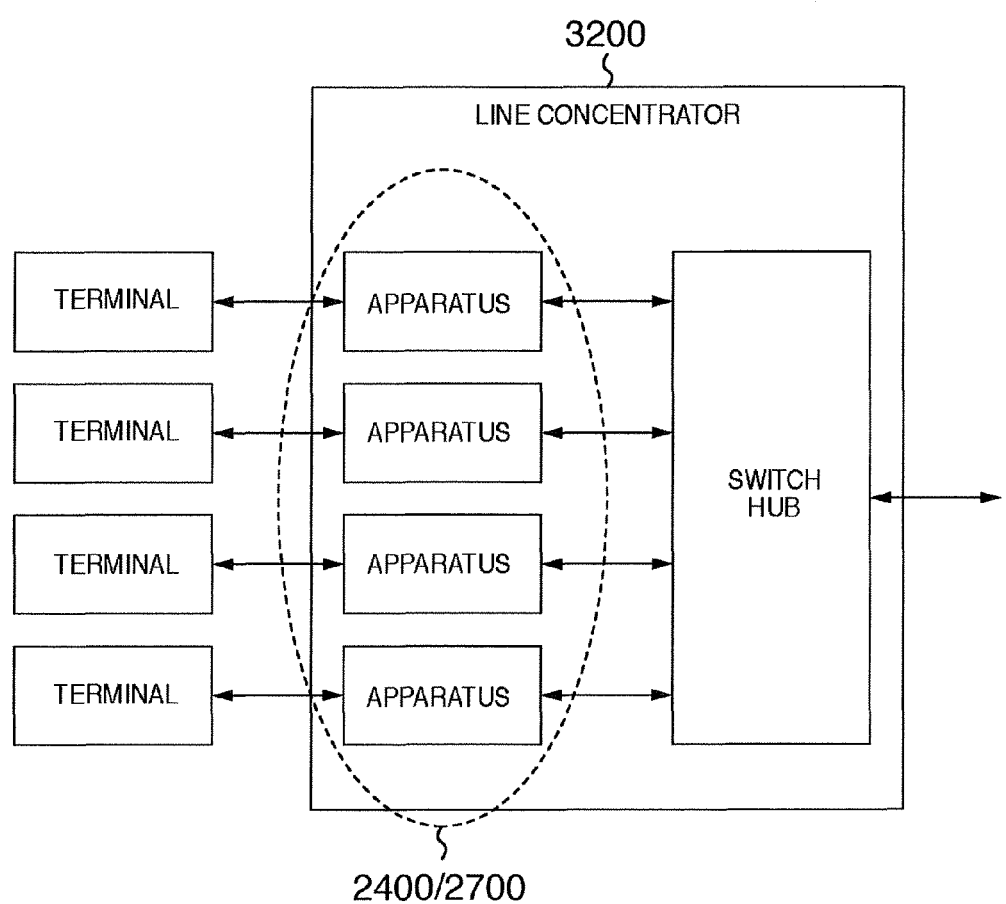
FIG. 32 is an explanatory diagram of one apparatus 3200 configured by connecting a plurality of apparatuses 2400/2700 with a switch HUB.

In FIG. 32 is shown an embodiment of one apparatus 3200 configured by connecting plurality of apparatuses 2400/2700 to a switch HUB.

Because a plurality of apparatuses can share the table for managing information on connection number, the present embodiment can reduce cost.

Embodiment 11

Figure 33:
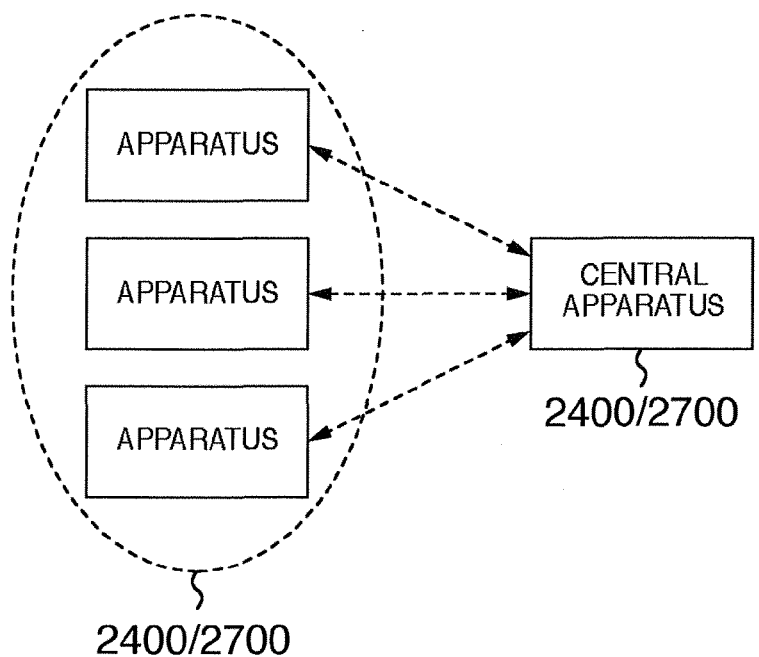
FIG. 33 shows a system for mutually notifying information on connection number used in bandwidth control, between a central apparatus and other apparatuses.

In FIG. 33 is shown an embodiment of a system for mutually notifying information on connection number to be used for bandwidth control, between a central apparatus and other apparatuses, by installing a plurality of apparatuses 2400/2700 described in Embodiment 7 or Embodiment 8.

Because information concentrated to a central apparatus is redistributed to each apparatus, the present embodiment can reduce communication times as compared with mesh-like mutual notification.

Embodiment 12

Figure 34:
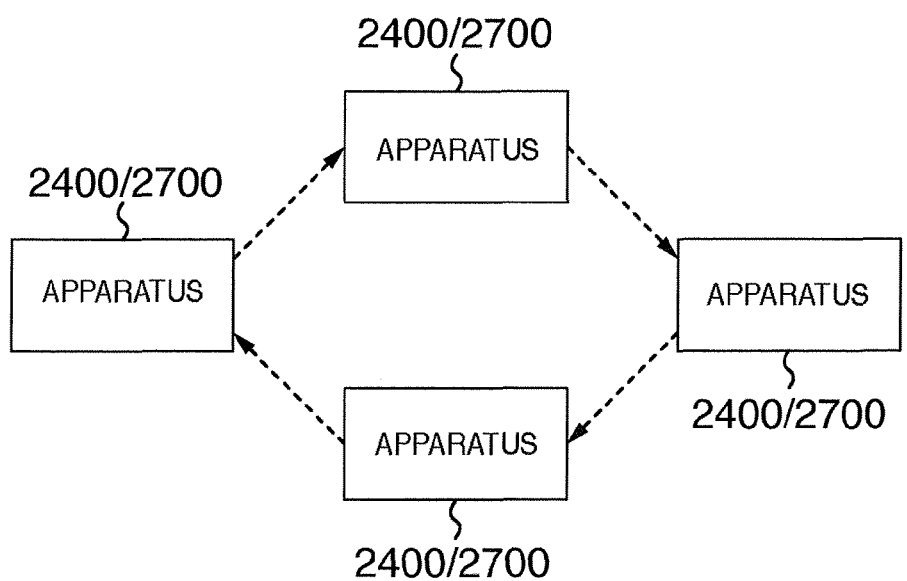
FIG. 34 shows a system for mutually notifying, in loop way, information on connection number used in bandwidth control.

With reference to FIG. 34 is explained an embodiment of a system of mutual loop-like notification of information on connection number to be used for bandwidth control, by installing a plurality of apparatuses 2400/2700 described in Embodiment 7 or Embodiment 8.

The present Embodiment can reduce communication times as compared with mesh-like mutual notification.

As clarified by the above various embodiments, in performing communication between a certain communication terminal and another communication terminal, by taking over bandwidth control of communication or retransmission control by two or more apparatuses installed among a plurality of communication terminals, speed up of communication can be attained.

Although description has been given on embodiments, the present invention should not be limited to those embodiments, and it is apparent to a person skilled in the art that various changes and modifications may be made within the spirit of the invention and the scope of the appended claims.

REFERENCE SIGNS LIST

100 Apparatus
101 Terminal
800 Apparatus
900 Apparatus
1200 Apparatus
1600 Apparatus
2200 Apparatus
2400 Apparatus
2700 Apparatus
3000 Apparatus

The invention claimed is:

1. A first communication apparatus to be connected to a network comprising:
a bandwidth control unit for, with respect to each interval, managing bandwidth relating to a packet to be transmitted from the first communication apparatus via the network to a second communication apparatus, and changing a control bandwidth for sending a packet from a first control bandwidth in a first interval to a second control bandwidth after a second interval based on managed retransmission bandwidth or managed discard bandwidth in the second interval and the first control bandwidth in the first interval that is prior to the second interval; and
a transmission unit for sending a packet to the network, according to the second control bandwidth,
wherein the bandwidth control unit
receives a reception status acknowledgement relating to reception of the transmitted packet, from the second communication apparatus,
detects a discard status or a retransmission status on the network of the packet transmitted to the second communication apparatus, from the reception status acknowledgement, and
changes the control bandwidth based on the discard bandwidth determined based on the discard status or the retransmission bandwidth determined based on the retransmission status,
the discard bandwidth is obtained by summing discarded segments from the discard status, and
the retransmission bandwidth is obtained by summing retransmission segments from the retransmission status.

2. The first communication apparatus according to claim 1, wherein
the bandwidth control unit reduces the second control bandwidth as compared with the first control bandwidth by an amount of the managed retransmission bandwidth.

3. The first communication apparatus according to claim 2, wherein
the first communication apparatus is connected to one or more information processing apparatuses; and
the transmission control unit transmits a packet including information transmitted by the information processing apparatuses, according to the second control bandwidth.

4. The first communication apparatus according to claim 1, wherein
the bandwidth control unit acquires a communication status of the transmitted packet, and controls the change in control bandwidth, based on the acquired communication status.

5. The first communication apparatus according to claim 4, wherein
the communication status includes reception information indicating whether or not the transmitted packet has been received by the second communication apparatus; and
the bandwidth control unit detects that a packet has not been received, based on the reception information, and controls the change in control bandwidth, based on the detection result.

6. The first communication apparatus according to claim 5, wherein
the first communication apparatus is connected to one or more information processing apparatuses; and
the transmission control unit transmits a packet including information transmitted by the information processing apparatuses, according to the second control bandwidth.

7. The first communication apparatus according to claim 4, wherein
the first communication apparatus is connected to one or more information processing apparatuses; and
the transmission control unit transmits a packet including information transmitted by the information processing apparatuses, according to the second control bandwidth.

8. The first communication apparatus according to claim 1, wherein
the first communication apparatus is connected to one or more information controlled apparatuses; and
the transmission control unit transmits a packet including information transmitted by the information processing apparatuses, according to the transmission bandwidth.

9. The first communication apparatus according to claim 1, wherein
the bandwidth control unit further changes the control bandwidth, based on a connection number of packets received from the network.

10. The first communication apparatus according to claim 1, wherein
the bandwidth control unit measures a packet retransmitting connection number, and changes the control bandwidth, based on the packet retransmitting connection number.

11. The first communication apparatus according to claim 1, wherein the first communication apparatus is connected to one or more information processing apparatuses; and the transmission control unit transmits a packet including information transmitted by the information processing apparatuses, according to the second control bandwidth.

12. A communication system comprising a first communication apparatus and a second communication apparatus to be connected to the first communication apparatus via a network, wherein
the first communication apparatus comprises:
a bandwidth control unit for, with respect to each interval, managing bandwidth relating to a packet to be transmitted from the first communication apparatus via the network to a second communication apparatus, and changing a control bandwidth for sending a packet from a first control bandwidth in a first interval to a second control bandwidth after a second interval based on managed retransmission bandwidth or managed discard bandwidth in the second interval and the first control bandwidth in the first interval that is prior to the second interval; and a transmission unit for sending a packet to the network, according to the second control bandwidth, wherein the bandwidth control unit receives a reception status acknowledgement relating to reception of the transmitted packet, from the second communication apparatus, detects a discard status or a retransmission status on the network of the packet transmitted to the second communication apparatus, from the reception status acknowledgement, and changes the control bandwidth based on the discard bandwidth determined based on the discard status or the retransmission bandwidth determined based on the retransmission status, the discard bandwidth is obtained by summing discarded segments from the discard status, and the retransmission bandwidth is obtained by summing retransmission segments from the retransmission status.

13. The communication system according to claim 12, wherein the bandwidth control unit reduces the second control bandwidth as compared with the first control bandwidth by an amount of the managed retransmission bandwidth.

\* \* \* \* \*